(12) United States Patent
Jur et al.

(10) Patent No.: US 10,602,791 B2
(45) Date of Patent: Mar. 31, 2020

(54) MULTI-LAYERED PROTECTIVE COVERING AND USES THEREOF

(71) Applicants: North Carolina State University, Raleigh, NC (US); The United States of America, as Represented by the Secretary of the Army, Washington, DC (US)

(72) Inventors: Jesse S. Jur, Raleigh, NC (US); Russell E. Gorga, Raleigh, NC (US); Macon Adams, Blacksburg, VA (US); Shannyn A. Holder, Belmont, NC (US); Hilary Walker, Kernersville, NC (US); Caryn A. Siggins, Cary, NC (US); Carson Binns, Hickory, NC (US); Austin W. Teague, Kure Beach, NC (US); Andrew Nesbitt, Pleasant Garden, NC (US); Albena Ivanisevic, Chapel Hill, NC (US); Jon Rust, Cary, NC (US); James A. Murdock, Raleigh, NC (US); Carly M. Bohnenblusch, Raleigh, NC (US); Andrew M. Thomas, II, Raleigh, NC (US); Benjamin Anthony, Matthews, NC (US); Paul Reid, Durham, NC (US); Stephen Lee, Durham, NC (US); Clinton R. George, Athens, GA (US)

(73) Assignees: North Carolina State University, Raleigh, NC (US); The United States of America as Represented by the Secretary of the Army, Washington, DC (US)

( * ) Notice: Subject to any disclaimer, the term of this patent is extended or adjusted under 35 U.S.C. 154(b) by 578 days.

(21) Appl. No.: 15/130,134

(22) Filed: Apr. 15, 2016

(65) Prior Publication Data
US 2017/0340039 A1  Nov. 30, 2017

Related U.S. Application Data

(60) Provisional application No. 62/147,729, filed on Apr. 15, 2015.

(51) Int. Cl.
*A41D 31/00*  (2019.01)
*A01K 15/02*  (2006.01)
(Continued)

(52) U.S. Cl.
CPC ........ *A41D 31/0061* (2013.01); *A01K 13/007* (2013.01); *A01K 15/02* (2013.01);
(Continued)

(58) Field of Classification Search
CPC ........ A01K 13/007; A01K 15/02; A41D 1/04; A41D 13/02; A41D 13/0543; A41D 13/08; A41D 31/0061
(Continued)

(56) References Cited

U.S. PATENT DOCUMENTS 2,239,223 A * 4/1941 Gilman .................. A63B 71/12
                                               2/22
3,191,185 A   6/1965 Martin
(Continued)

OTHER PUBLICATIONS

Soshkin, Maksim, "Body armor manufacturing in the US," IBISWorld Industry Report OD5952, 2016, pp. 1-36.
(Continued)

*Primary Examiner* — Gloria M Hale
(74) *Attorney, Agent, or Firm* — Thomas|Horstemeyer, LLP

(57) ABSTRACT

Provided herein are multi-layered protective coverings, wearable multi-layered protective devices, and methods of
(Continued)

using the multi-layered protective coverings and wearable multi-layered protective devices.

18 Claims, 26 Drawing Sheets

(51) Int. Cl.
    *A01K 13/00*     (2006.01)
    *A41D 13/08*     (2006.01)
    *A41D 1/04*     (2006.01)
    *A41D 13/05*     (2006.01)
    *A41D 13/02*     (2006.01)
    *A41D 31/24*     (2019.01)

(52) U.S. Cl.
    CPC .............. *A41D 1/04* (2013.01); *A41D 13/02* (2013.01); *A41D 13/0512* (2013.01); *A41D 13/0518* (2013.01); *A41D 13/0543* (2013.01); *A41D 13/08* (2013.01); *A41D 31/245* (2019.02)

(58) Field of Classification Search
    USPC .......................... 2/16, 22, 24, 455, 242, 456
    See application file for complete search history.

(56) References Cited

U.S. PATENT DOCUMENTS

| | | | |
|---|---|---|---|
| 3,562,810 A | | 2/1971 | Davis |
| 3,902,196 A | | 9/1975 | Reinfandt |
| 4,602,385 A | * | 7/1986 | Warren ............... A41D 13/0153 2/2.14 |
| 5,023,953 A | * | 6/1991 | Bettcher ................ A41D 13/05 2/126 |
| 5,052,052 A | * | 10/1991 | Gilford ................ A41D 13/015 2/16 |
| 5,182,812 A | * | 2/1993 | Goldsby ................ A61H 36/00 2/227 |
| 5,325,537 A | * | 7/1994 | Marion ............... A41D 13/0153 2/102 |
| 5,611,080 A | * | 3/1997 | Skottheim .......... A41D 13/0568 2/16 |
| 5,876,834 A | * | 3/1999 | Foy .................... A41D 31/0061 2/2.5 |
| 5,911,197 A | * | 6/1999 | Schmid .................. A01K 15/02 119/709 |
| 6,721,959 B1 | | 4/2004 | Hairston |
| 6,918,355 B1 | * | 7/2005 | Arvanites ............ A01K 15/026 119/707 |
| 9,781,962 B2 | * | 10/2017 | McClure ............ A41D 31/0061 |

OTHER PUBLICATIONS

Harris, Tom. How Body Armor Works, How Stuff Works, pp. 1-3. Accessed Apr. 2017, Available: http://science.howstuffworks.com/body-armor1.htm.
Koren, Marina. Chainmail, Metal Spikes and Unbreakable Material: Can We Design a 'Shark-Proof' Wetsuit? pp. 1-7. Accessed Apr. 2017, Available: http://www.smithsonianmag.com/arts-culture/chainmail-metal-spikes-and-unbreakable-material-can-we-design-a-shark-proof-wetsuit-27310741/?no-ist.
S. LLC, "Neptech Material," 0:25, Youtube, pp. 1-2, 2011.
M. Mott, "Dogs of War: Inside the U.S. Military's Canine Corps," National Geographic, pp. 1-2, Apr. 2003. Accessed Apr. 2017, Available: http://news.nationalgeographic.com/news/2003/04/0409_030409_militarydogs.html.
J. Rizzo, When a Dog Isn't a Dog, CNN Security Clearance, CNN (Jan. 6, 2012), pp. 1-7. Accessed Apr. 2017, Available: http://security.blogs.cnn.com/2012/01/06/when-a-dog-isnt-a-dog/.
Elite K-9 Hidden Sleeves, Elite K-9 Website, pp. 1-2. Accessed Apr. 2017, Available: http://www.elitek9.com/Hidden-Sleeve/products/111/.
Fuji Prescale® Film Reveals Surface Contact Pressure Distribution and Magnitude, pp. 1-2. Accessed Apr. 2017, Available: http://www.sensorprod.com/campaign/film/index.php?mcode=GC-Product%20-%20Fujifilm%20Prescale%20-%201&gclid=CI_hwq2tpsUCFdcegQod0qMA8g.
History, K2 Solutions, pp. 1-2. Accessed Apr. 2017, Available: http://k2si.com/who-we-are/history/.
T. Buerck, "Interview with First Spear Manufacturing," Overview of First Spear Manufacturing, Apr. 22, 2015. Accessed Apr. 2017, Available: http://www.first-spear.com/skin/files/FSCatalogSummer2013V5.pdf. pp. 1-68.
Arm Cross-Section, Physical Therapy Aide Demo, pp. 1-3. Accessed Apr. 2017, Available: http://www.gatlineducation.com/demo/PTA_Demo_2012/html/L05/L05CH04P01.html.
J. Eells, "Dogs of War," Texas Monthly (Nov. 2011), pp. 1-9. Accessed Apr. 2017, Available: http://www.texasmonthly.com/articles/dogs-of-war/.
T. L. English, "The Quiet Americans: A History of Military Working Dogs," 2000, pp. 1-26. Accessed Apr. 2017. Available: http://www.uswardogs.org/PDF/History-of-MWD.pdf.
U.S. War Dog History, The United States War Dogs Association, Inc., 2012, pp. 1-3. Accessed Apr. 2017. Available: http://www.uswardogs.org/id10.html.
History of War Dogs, Huffington Post, Apr. 25, 2013, pp. 1-7. Accessed Apr. 2017. Available: http://www.huffingtonpost.com/2013/04/25/history-of-war-dogs-_n_3155904.html.
"Military Working Dogs," Military Police, Army Regulation 190-12, Mar. 11, 2013, pp. 1-57.
Gallagher, A.J., Ní Anniadh, A., "Dynamic Tensile Properties of Human Skin," pp. 494-494-502, 2012.
Industrial Safety Aprons Made From TurtleSkin Fabrics, TurtleSkin, pp. 1-2. Accessed Apr. 2017, Available: http://turtleskin.com/industrial-safety/aprons.
Colas, Silicones: Preparation, Properties and Performance, Dow Corning Life Sciences, 2005, pp. 1-14.
Super Softy Garment PigSkin Suede Sand, Tandy Leather, p. 1. Accessed Apr. 2017. Available: https://www.tandyleather.com/en/product/super-softy-garment-pigskin-suede.
SuperFabric, Hex Armor, 2013, pp. 1-2. Accessed Apr. 2017. Available: http://superfabric.com/pages/SF_Performance_abrasion.html.
New Fabric Works Like Human Skin: Drains Sweat, SciTechDaily, May 22, 2013, pp. 1-6. Accessed Apr. 2017. Available: http://scitechdaily.com/new-fabric-works-like-human-skin-drains-sweat/.
S. Laksanacharoen, "Artificial muscle construction using natural rubber latex in thailand," pp. 1-3. Accessed Apr. 2017. Available: http://www.biobot.kmutnb.ac.th/publications/msat.pdf.
MaterialsView Staff, "New carbon nanotube aerogel with cheap materials," pp. 1-4, Mar. 1, 2013. Accessed Apr. 2017, Available: http://www.materialsviews.com/new-carbon-nanotube-aerogel-with-cheap-materials/.
Descriptions of Foam Types, Qualities and Common Uses, Foam Online, pp. 1-5, Accessed Apr. 2017, Available: http://www.foamonline.com/types.php?cartID=60c3bb9c2dad8a63cb4d8c79932cefdb.
Clear Ballistics, pp. 1-5. Accessed Apr. 2017, Available: http://clearballistics.com/.
Kevlar, Military Body Armor, DuPont, pp. 1-3. Accessed Apr. 2017, Available: http://www.dupont.com/products-and-services/personal-protective-equipment/body-armor/uses-and-applications/military-body-armor.html.
Shipman, M., New material mimics bone to create better biomedical implants, NC State News, Feb. 16, 2010, pp. 1-3. Accessed Apr. 2017, Available: http://news.ncsu.edu/releases/wmsrabieielasticity/.
B. Michaels, "Composite Metal Foam Material Could Be Tomorrow's Knee Cap," MPMN, vol. 26, p. 1-2, 2010. Accessed Apr. 2017, Available: http://www.qmed.com/mpmn/article/composite-metal-foam-material-could-be-tomorrows-knee-cap.
How a fire hose is made, How Products Are Made, 2014, pp. 1-4. Accessed Apr. 2017, Available: http://www.madehow.com/Volume-4/Fire-Hose.html.

(56) References Cited

OTHER PUBLICATIONS

Diab Group, Sandwich composites and core materials. Accessed Apr. 2017, Available: https://www.diabgroup.com/~media/Files/Brochures/DIAB%20Divinycell%20Core%20Guide%20-%20DIAB%20Knowledge%20Series.pdf. pp. 1-5.
Help . . . My Dog Ate Gorilla Glue! What Happens When Gorilla Glue Gets Wet, Preventative Vet, Nov. 4, 2012, pp. 1-4. Accessed Apr. 2017, Available: http://www.preventivevet.com/dogs/dogs-and-glue.
Bonding [Dental Bonding], Colgate Oral Care Center, Feb. 28, 2004, pp. 1-2. Accessed Apr. 2017, Available: http://www.colgate.com/app/CP/US/EN/OC/Information/Articles/Cosmetic-Dentistry/Bonding/Bonding-Basics/article/Bonding.cvsp.
Adhesion Strength Testing of Bioadhesives, Instron, pp. 1-3. Accessed Apr. 2017, Available: http://www.instron.us/wa/solutions/Adhesion-Strength-Testing-of-Bioadhesives.aspx.
K. Sivertsen, "Polymer Foams," 2007, pp. 1-17. Accessed Apr. 2017, Available: http://ocw.mit.edu/courses/materials-science-and-engineering/3-063-polymer-physics-spring-2007/assignments/polymer_foams.pdf.
SuperFabric Puncture, HexArmor, pp. 1-3. Accessed Apr. 2017, Available: https://www.hexarmor.com/technologies/superfabric-puncture.
Composite sandwiches, Discovery Projects EPFL, Aug. 2014, p. 1-2. Accessed Apr. 2017, Available: http://discovery.epfl.ch/page-105679-en.html.
E. R. Hickey and P. B. Hoffman. To bite or not to bite: Canine apprehensions in a large, suburban police department. Journal of Criminal Justice 31(2), pp. 147-154. 2003.
Bite Sleeves, Ray Allen Manufacturing, pp. 1-5. Accessed Apr. 2017, Available: http://www.rayallen.com/category/Bite-Sleeves.
About Us, Kurt USA Manufacturer, pp. 1-2. Accessed Apr. 2017, Available: https://www.kurtusa.com/about.php.
Arminleggan G2 Rubber Arm Fist, Arminleggan, pp. 1-2. Accessed Apr. 2017, Available: http://www.arminleggan.com/items/arminleggantm-g2-rubber-arm/.
V. Ryan, What is Kevlar? Types of Kevlar, technologystudent.com, pp. 1-3. Accessed Apr. 2017. Available: http://www.technologystudent.com/joints/kevlar2.html.
How It Works, Xrd Extreme Impact Protection, pp. 1-3. Accessed Apr. 2017, Available: http://www.poronxrd.com/howitworks/index.aspx.
Sherman, Dave. Open Cell vs Closed Cell Cushioning Foams—Tips for Choosing the Best Material for Your Product Design. Poron Performance Cushioning, pp. 1-6. Accessed Apr. 2017, Available: http://blog.poroncushioning.com/open-cell-vs-closed-cell-foam-tips-for-choosing-the-best-material-for-your-product-design/.
D. E. Beers and J. E. Ramirez. Vectran high-performance fibre. The Journal of the Textile Institute 81(4), pp. 561-574. 1990.
X. Liu, Y. Gao, L. Bian and Z. Wang. Preparation and characterization of natural rubber/ultrafine full-vulcanized powdered styrene-butadiene rubber blends. Polymer Bulletin 71(8), pp. 2023-2037. 2014.
CEAST Model 9350, Instron, pp. 1-3. Accessed Apr. 2017, Available: http://www.instron.us/wa/product/CEAST-9350-Drop-Tower.aspx.
G. Peters and S. Meier, "Uster laboratory systems," Uster, Tech. Rep. 3, Jul. 2010. pp. 1-47.
Top-load Testing. Available: http://www.hartech.nl/sites/all/files/users/moderator/Mecmesin/Brochures/InfoShare-Solutions/top-load_brochure_05_english_xt.pdf. pp. 1-8.
Woven & Knit Residential Upholstery Fabric Standards & Guidelines, Joint Industry Fabrics Standards Committee, 2009. pp. 1-61.

\* cited by examiner

MULTI-LAYERED PROTECTIVE COVERING AND USES THEREOF

CROSS-REFERENCE TO RELATED APPLICATIONS

This application claims the benefit of and priority to U.S. Provisional Patent Application No. 62/147,729, filed on Apr. 15, 2015, entitled "MULTI-LAYERED PROTECTIVE COVERING AND USES THEREOF," the contents of which is incorporated by reference herein in its entirety.

STATEMENT REGARDING FEDERALY SPONSORED RESEARCH OR DEVELOPMENT

This invention was made with government support under grant number W911NF-13-C-0045 awarded by the U.S. Army Research Office. The government has certain rights to this invention.

BRIEF DESCRIPTION OF THE DRAWINGS

Further aspects of the present disclosure will be readily appreciated upon review of the detailed description of its various embodiments, described below, when taken in conjunction with the accompanying drawings. Drawings are not to scale unless otherwise specified.

FIGS. 6A and 6B demonstrate the device in an open position (FIG. 6A) and a closed position (FIG. 6B).

FIG. 9A shows example sizing for a small (FIG. 9A) and a large (FIG. 9B).

FIG. 12A shows a cutaway view demonstrating various layers of the device shown in FIG. 12B.

FIG. 19A shows a top view of the device. FIG. 19B shows a lateral view of the device in a bent position

DETAILED DESCRIPTION

Figure 1:
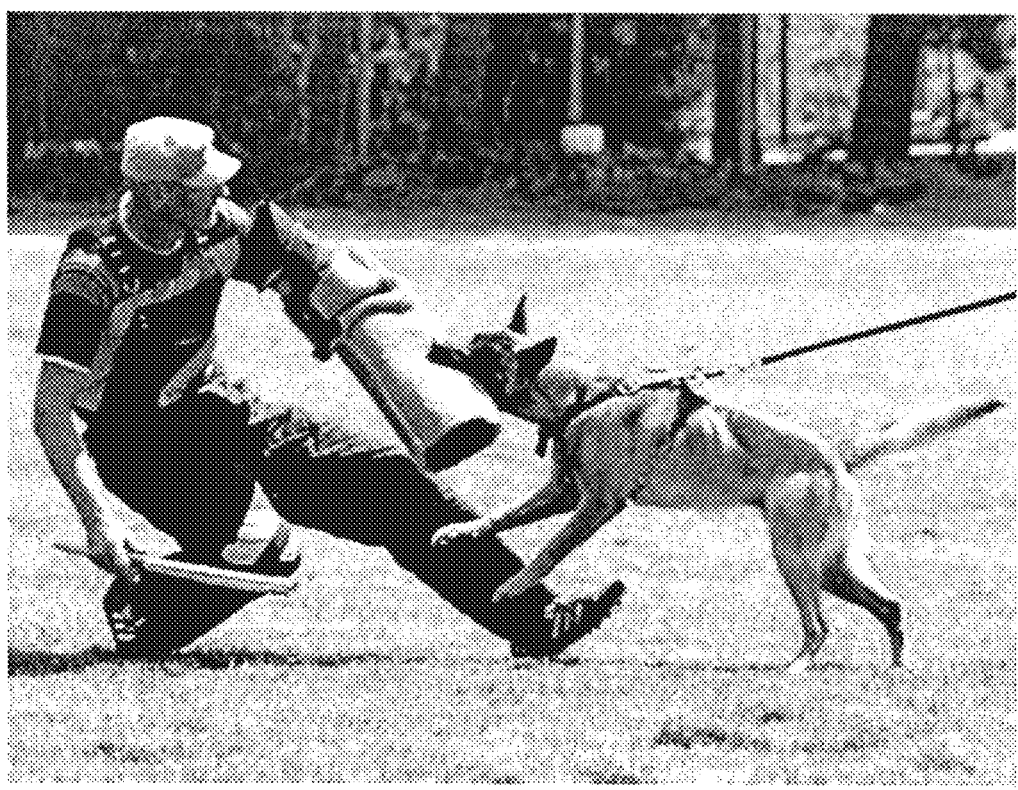
FIG. 1 shows a canine being trained to attack using a protective bite sleeve.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of material sciences, mechanical engineering, textile manufacturing, textile engineering, and the like, which are within the skill of the art. Such techniques are explained fully in the literature.

Canines have shared their lives and abilities with humans for over 20,000 years. Even before dogs, wolves were used for hunting purposes and protecting humans from dangerous predators. Some of the earliest records indicate canines were used by the Egyptians; they would train their canines to assault and help capture their enemies. As time advanced, dogs were introduced into the government as military working dogs. The first time canines were used in warfare in the United States was during 1914 in World War I. Two of the most common breeds for military purposes are the German and the Belgian Malinois. Dogs can be trained to perform many functions that are useful for the military and other law enforcement agencies. Dogs can be trained, for example, to detect odors such as those that come from explosives or narcotics, track human scent for rescue missions, and to attack on command to protect their handlers from harm. A dog can have a bite force of about 600 psi, which is enough to kill or injure an attacker. Today, dogs are a valuable asset of the military and other law enforcement agencies and protection services.

As the role for dogs in the military expanded, so did the training equipment and methods for teaching a dog to attack on command. As shown in FIG. 1, during training the dog is taught to target a particular area of the body. Typically this is the upper arm and forearm of the attacker, due to the presence and vulnerability of tendons in those areas. Damage to this area is painful and makes it difficult for the attacker to disengage from the dog bite. During training the trainer imitates the enemy and guides the dog to attack them. As such, the trainer must have adequate protection for themselves during these training sessions. During training, 'mis-bites' (i.e. biting in a non-target area) and disengagements with the trainer can occur. These types of bites, if in a live combat situation, can give the attacker the opportunity to cause harm to the dog or escape. As it is not ideal to have a dog bite a victim, relapse and re-bite for a better grip or in non-target areas, these actions are negatively reinforced during training sessions. Negative reinforcement may be necessary to teach a dog that an action was incorrect, but it can create fear in the dog and complicate training.

With the amount of bite force generated by the dogs, the trainer runs a significant risk of injury such as bruising, punctures to the skin, and broken bones. Further, the training process can be dangerous for the dog. For example, the protective gear has the potential to be toxic to the dog or damage the teeth and jaw of the dog depending on the materials used.

Additionally, research suggests a disconnection when trained attack dogs attack a real victim for the first time. The feel of a real human arm is different than the protective gear used in training. This disconnect can cause undesirable disengagement of the bite or fear in the dog that they have done something wrong.

While there are several available protective sleeves for training attack dogs, they all have significant limitations for the trainer, dog, or both. Current sleeves suffer from, inter alia being too bulky, stiff, having attachments that are potentially hazardous to the dog, being expensive, having a low durability, being unrealistic, and increasing the opportunity for mis-bites.

With that said, described herein is a protective covering having multiple flexible layers that can, in some embodiments, provide protection to a trainer while being safe for the dog. Further the protective coverings described herein can be more similar to a human arm than current protective sleeves, thereby decreasing the observed disconnection between training and live-combat situations, while still providing adequate protection for the trainer.

Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Figure 2A:
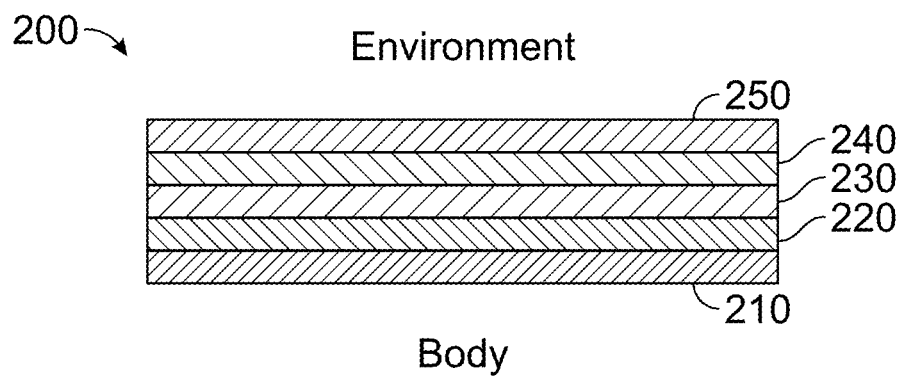
FIGS. 2A-2B show cross sectional views of some embodiments of a multi-layered protective covering.
Figure 2B:
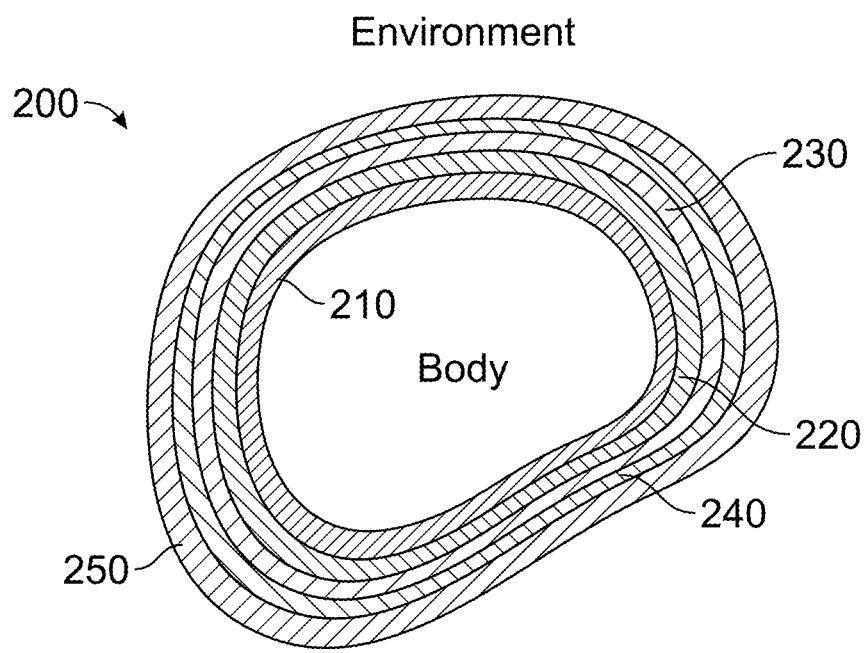

The discussion of the various embodiments of the multi-layered protective coverings described herein begins with FIGS. 2A and 2B, which show cross sectional views of some embodiments of a multi-layered protective covering 200 described herein. The multi-layered protective covering 200 can contain four or more flexible layers (220-240) with an optional removable outer layer (e.g. a fifth layer, 250) that can be in contact with the four or more flexible layers 220-240, for example, during use. The total thickness of the four or more layers 220-240 (without the removable outer layer 250) can range from about 0.5 cm to about 2.0 cm. As used herein, "about," "approximately," and the like, when used in connection with a numerical variable, generally refers to the value of the variable and to all values of the variable that are within the experimental error (e.g., within the 95% confidence interval for the mean) or within ±10% of the indicated value, whichever is greater. Including the optional removable outer layer 250, the thickness of the multi-layered protective covering 200 can range from about 0.5 cm to about 2.0 cm. In some embodiments, the multi-layered protective covering 200 can be thin enough to be concealed under normal clothing. As is described in greater detail herein, the multi-layered protective covering 200 can be configured as and/or incorporated as part of a variety of wearable protective devices such as, but not limited to, partial and whole bite protection sleeves, torso vests, and whole body suits. Other types of wearable protective devices will be appreciated by those of ordinary skill in the art and are within the scope of this disclosure. FIG. 2B shows the multi-layered protective covering 200 described herein configured as a sleeve.

The multi-layered protective covering 200 can have a first flexible layer 210, where the first flexible layer 210 can contain or be composed entirely of a suitable body-interface material. The first flexible layer 210 is the layer of multi-layered protective covering 200 that can come in direct contact with a portion of a human or animal using a wearable device (e.g. protective gear) that can be made entirely from or at least includes the multi-layered protective covering 200 described herein.

As used herein, "body-interface material" refers to materials that are suitable for coming in contact with a portion of the body, such as an arm, leg, or torso. The body-interface material can be such that it provides minimal discomfort when in contact with a portion of the body, including when the body is in motion, such as the motions that occur during canine training or combat. Suitable body-interface materials include, but are not limited to, nylon, spandex material, lycra, neoprene, jersey knit, polyester polypropylene, flannel, cotton knit, neoprene foam, or combinations or composites thereof. Composites as used with reference to the first layer 210 refers to a mixture of different fiber types woven or knit to produce a single textile layer. The body-interface material can be woven, knit, or otherwise manufactured as generally known in the art. The body-interface material can have a denier ranging from about 10D to about 600D. The first layer 210 can be multilayered itself and can include two or more layers of suitable-body interface materials. All the layers can be made of the same material. In other embodiments, at least one of the layers can be made from a material that is different from the material of at least one other layer. This includes embodiments where each layer is made from a different material. The first flexible layer 210 (single or multi-layered) can range in thickness from about 2 mm to about 8 mm. The optional multiple layers of the first flexible layer 210 can be attached to one another such that the first flexible layer 210 is a laminate.

The multilayered protective covering 200 can contain a second flexible layer 220, where the second flexible layer 220 can contain or be made entirely of a force-dissipating material. The second flexible layer 220 can be attached or to one side of the first flexible layer 210. Unless stated otherwise, as used herein "attached" refers to a direct and generally non-removable connection between one or more materials described herein. Attached can include, but is not limited to, the bonding, sewing, gluing, or otherwise joining two or more materials such that they are in direct physical contact with one another. The second flexible layer 220 can range in thickness from about 0.1 cm to about 1.0 cm.

The second flexible layer 220 can be multilayered and include two or more layers of materials. While in some embodiments each layer of a multilayered flexible layer 220 each layer is made of a force-dissipating material, in some embodiments at least one or more of the layers is not made from a material that is itself force-dissipating. In these latter described embodiments, the layers when considered collectively can form a force-dissipating layer. In some embodiments, all the layers of the flexible second layer 220 can be made of the same material. In other embodiments, at least one of the layers of the flexible second layer 220 can be made from a material that is different from the material of at least one other layer. This includes embodiments where each layer of the flexible second layer 220 is a different material. The optional multiple layers of the second flexible layer 220 can be attached to one another such that the second flexible layer 220 is a laminate.

As used herein "force-dissipating" refers to the ability of a material to transfer the kinetic energy of a force applied to the material away from the point of impact, thus spreading the kinetic energy away from the impact location and distributing the energy over a larger area in the material. In other words, the "force dissipating" is used interchangeably herein with the phrase "force absorbing" The force-dissipating ability of a material can be determined by measuring compressive force, such as with a Mecmesin Top-load tester. The Mecmesin Top-load tester measures the axial load strength of a material and can exert a force of up to 1100 lbf, while simultaneously measuring changes in the material height and peak compressive strength. Under this test a suitable force dissipating material for use in the multi-layered protective covering 200 described herein can be one that can have less than about 90% deflection at 400 lbf. The force-dissipating material can have a Young's modulus ranging from about 2 PSI to about 200 PSI. In some embodiments, the force-dissipating material can have a Yong's modulus ranging from about 20 PSI to about 200 PSI, about 2 PSI to about 90 PSI, or about 123 PSI.

Suitable force-dissipating materials include, but are not limited to, high-density polyurethane foam, low-density polyurethane foam, high-density polyethylene foam, low-density polyethylene foam, latex foam, viscoelastic foam, gel visco foam, neoprene foam, Sorbothane® foam, Poron® foam, metal foam, ballistic gel, natural or synthetic rubber or combinations thereof. Foams used for the second layer can be open cell or closed cell foams. In some embodiments, polyurethane foam can be used as the force dissipating material. The density of the polyurethane foam can range from about 9 pcf (pounds per cubic foot) to about 50 pcf. In other embodiments, Poron®25 dura foam can be used as a force-dissipating material.

The multi-layered protective covering 200 can also include a third flexible layer 230, where the third flexible layer 230 can contain or be made entirely of a soft-tissue simulating material. The third flexible material 230 can be attached to the second layer 220 such that the second flexible layer 220 is sandwiched between the third flexible layer 230 and the first flexible layer 210. The thickness of the third flexible layer 230 can range from 0.5 cm to 1.5 cm.

In some embodiments, the second flexible layer 220 and the third flexible layer 230 can be combined into one layer. In other words, in some embodiments, the force-dissipating material and the soft-tissue simulating material are the same material and thus form a single layer instead of two separate layers. In embodiments where the second flexible layer 220 and the third flexible layer 230 are a single layer, the thickness of this layer having the force-dissipating material/soft-tissue simulating material can range from about 1 cm to about 2.5 cm.

The third flexible layer 230 can itself be multilayered and thus contain two or more layers of materials. In embodiments, the layers can be made of the same material. In other embodiments, at least one of the layers can be made from a material that is different from the material of at least one other layer. This includes embodiments where each layer of the flexible third layer 230 is a different material. The optional multiple layers of the third flexible layer 230 can be attached to one another such that the third flexible layer 230 is a laminate.

As used herein, "soft-tissue simulating material" refers a material that is similar in look, feel, density, viscosity, resilience, or other characteristic to muscle, fat, or an organ (not including the skin) of a human or other mammal. Suitable soft tissue simulating materials include, but are not limited to, ballistic gel, high-density polyurethane foam, low-density polyurethane foam, high-density polyethylene foam, low-density polyethylene foam, latex foam, viscoelastic foam, gel visco foam, neoprene foam, Sorbothane® foam, Poron® foam, metal foam, natural rubber, synthetic rubber, or combinations thereof. In some embodiments, the soft-tissue simulating material can have a density of about 0.7 g/cm$^3$ to about 1.2 g/cm$^3$. The soft-tissue simulating material can have a Poisson's ration ranging from about 0.33 to about 0.37. The soft-tissue simulating material can have a compressive elastic modulus of about 0.2 to 0.3 MPa. In some embodiments, the soft-tissue simulating material can have a compressive elastic modulus of about 0.291 MPa. In some embodiments, the soft-tissue simulating material can be synthetic clear ballistic gel or gelatin-based ballistic gel.

The multi-layered protective covering 200 can also include a fourth flexible layer 240, where the fourth flexible layer 240 can contain or be made entirely of a puncture-resistant material. The puncture-resistant material can be attached to the one side of the third flexible layer 230 such that the third flexible layer 230 is sandwiched between the second flexible layer 220 and the fourth flexible layer 240. The thickness of the fourth flexible layer 240 can range from about 0 cm to about 0.2 cm.

The fourth flexible layer 240 can itself be multi-layered. The fourth flexible layer 240 can have at least two layers of the puncture resistant material. In some embodiments, the fourth flexible layer 240 can have about 2-10 layers of the puncture resistant material. In some embodiments, the fourth flexible layer 240 has 5 or 6 layers of puncture resistant material. The layers can be made of all the same puncture resistant material. In other embodiments, at least one of the layers of the puncture resistant material can be made of a different puncture resistant material from least one of the other layers of puncture resistant material. This includes where each layer is made from a different puncture resistant material. In some embodiments, not all the layers are made from a puncture resistant material, but collectively can be puncture resistant and thus form a layer that is puncture resistant.

In addition to the layer(s) of puncture-resistant material, the fourth flexible layer 240 can also include a tractable surface material that can provide a tractable surface for a canine's (or other animal's) teeth. Suitable materials that can provide a tractable surface include, but are not limited to, a cotton/polyester blended fabric, Condura® Nylon and ballistic nylon. In some embodiments, the cotton/polyester blended fabric can have a 4×4 twill weave. The cotton/polyester blend can be made of high ply yarns and have a total denier of about 2000 D to about 3000 D. The material that provides a tractable surface can have a denier ranging from about 600 D to about 3000 D.

As used herein "puncture-resistant material" refers to a material that is substantially impervious to punctures by a physical object or can withstand a puncture with little or no damage to the overall integrity of the material. "Puncture-resistant material" refers also to a material with the ability to withstand puncture for the life of the protective covering or device incorporating the protective covering. Suitable puncture resistant materials include, but are not limited to, a Kevlar® fabric, carbon fiber, synthetic spider silk protein, HexArmor® fabric, TurtleSkin® fabric, Vectran® fabric, Spectra® fabric, ultra-high molecular weight polyethylene, or combinations thereof. In some embodiments, the puncture resistant-material can withstand about 20-50 bites from dog before having to be discarded due to loss of overall material integrity. In some embodiments, the puncture resistant material or layers thereof can have a 5 or less on the Moh's hardness scale. In other embodiments, the puncture resistant material has a tensile strength ranging from about 0 MPa to about 10 MPa. In some embodiments, the puncture resistant material can be loose weave Kevlar® fabric, tightly woven Kevlar® treated with a surfactant, ceramic coated Kevlar® fabric, Kevlar® 779 fabric, Kevlar® K129 fabric, Spectra® fabric, Vectran® fabric.

The multi-layered protective covering 200 can optionally include a fifth flexible layer 250, where the fifth flexible layer 250 contains a skin simulating material. The fifth flexible layer 250 can be in removable contact with one side of the fourth flexible layer 240 such that the fourth flexible layer 240 is sandwiched between the third flexible layer 230 and the fifth flexible layer 250. In some embodiments, such as those configured as a sleeve, the fifth flexible layer 250 can be configured to be removed and/or added by sliding over the fourth flexible layer 240 of the wearable protective sleeve. In other words, the fifth flexible layer 250 can be slidable and can slidably cover the fourth flexible layer 240.

The thickness of the fifth flexible layer 250 can range from about 2 mm to 12 mm. The fifth flexible layer 250 can be multilayered itself and include two or more layers of materials. All the layers can be made of the same material. In other embodiments, at least one of the layers can be made from a material that is different from the material of at least one other layer. This includes embodiments where each layer is a different material. The optional multiple layers of the fifth flexible layer 250 can be attached to one another such that the fifth flexible layer 250 is a laminate.

As used herein, "skin simulating material" refers to any material that has similar physical characteristics as to punctureability and similar feel in a dog's mouth as human skin. Suitable skin simulating materials include but are not limited to, silicone, leather, fresh pigskin, neoprene, polycarbonate, and combinations thereof. In some embodiments, the skin simulating material can have a water contact angle of about 86° to about 99°. In some embodiments, the skin simulating material can be medical grade silicone.

The multi-layered protective covering 200 can include an optional sixth flexible layer, where the optional sixth flexible layer can include a tractable surface material. The optional sixth flexible layer can include a tractable surface material that provides a tractable surface for a canine's (or other animal's) teeth. Suitable materials that can provide a tractable surface include, but are not limited to, a cotton/polyester blended fabric, Condura® nylon, ballistic nylon, or combinations thereof. In some embodiments, the cotton/polyester blended fabric can have a 4×4 twill weave. The cotton/polyester blend can be made of high ply yarns and have a total denier of about 2000 D to about 3000 D. This layer can provide protection for the fourth flexible layer, including the puncture resistant material. The material that provides a tractable surface can have a denier ranging from about 600 D to about 3000 D.

The optional sixth flexible layer can be attached to one side of the fourth flexible layer 240 such that the fourth flexible layer 240 is sandwiched between the third flexible layer 230 and the optional sixth flexible layer. In some embodiments, the optional sixth layer can be removably coupled to the further layer 240 such that the fourth flexible layer 240 is sandwiched between the third flexible layer 230 and the optional sixth layer. In some embodiments, the removable fifth flexible layer can be removably, such as slideably, in contact with to the optional sixth flexible layer such that the optional sixth flexible layer is sandwiched between the fourth flexible layer 240 and the fifth flexible layer 250. The optional sixth flexible layer can be multilayered and be made of two or more layers of materials. In some embodiments, all of the layers can be made of the same material. In other embodiments, at least one of the layers can be made from a material that is different from the material of at least one other layer. This includes where each layer is a different material. The optional multiple layers of the optional sixth flexible layer can be attached to one another such that the optional sixth layer is a laminate.

The multi-layered protective covering 200 can be configured into, included in, and/or adapted for use in wearable protective devices. Such wearable protective devices include, but are not limited to, protective leg and arm sleeves, torso vests, chest protectors, back protectors, abdomen protectors, and full protective body suits. The wearable protective devices can be so dimensioned to fit various body parts of both humans and animals, particularly those animals used in the military and other law enforcement agencies (e.g. but not limited to dogs and horses), that face the threat of bodily injury due to bullets, attack dogs, knives or other weapons. Suitable dimensions for the wearable devices for use on any human or animal body described herein will be instantly appreciated and will be obtainable by those of ordinary skill in the art without undue experimentation and through the use of routine techniques generally known in the art. Any of the wearable multilayered protection devices described herein can be used in a method of training an animal, such as a dog, to attack where the method includes encouraging the animal to bite the wearable multilayered protection device.

Figure 3A:
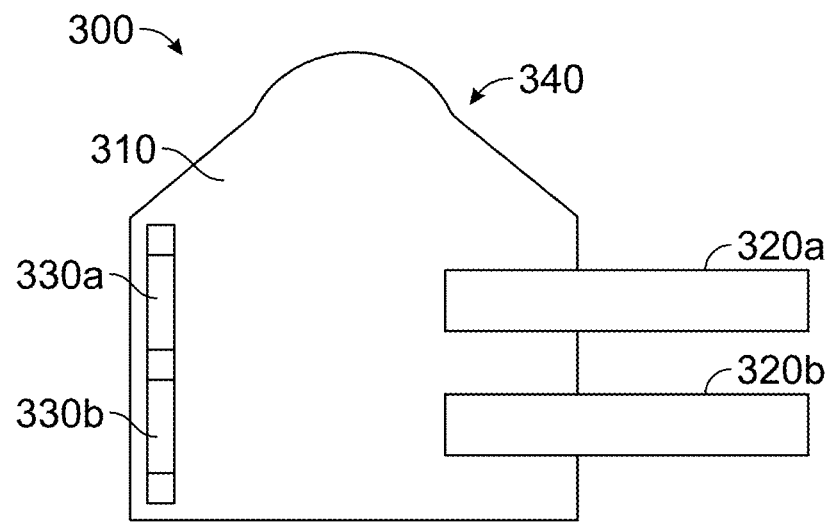
FIGS. 3A-3B show views of one embodiment of a wearable multi-layer protective device that at least includes a multi-layered protective covering as described herein.
Figure 3B:
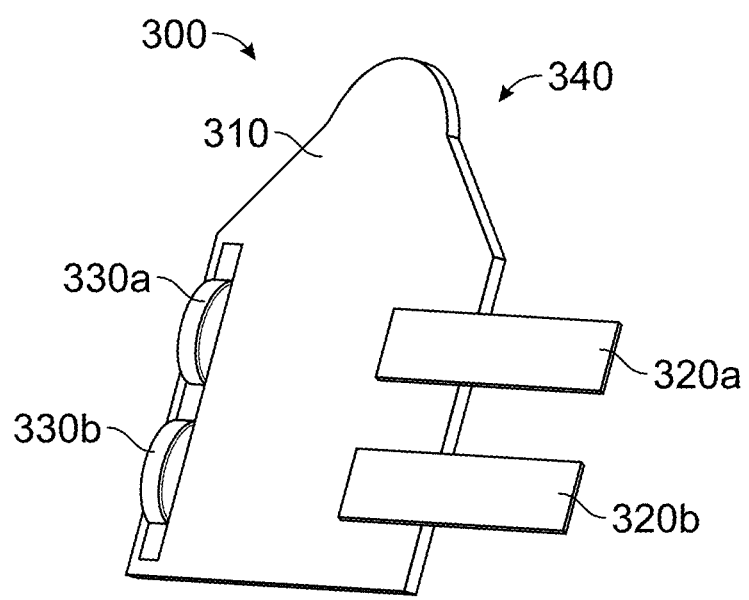

In some embodiments, the multi-layered protective covering can be configured into a wearable multi-layer protective device for use in training canines to attack a human. The wearable device can be configured to cover and/or encompass part of or all of an arm of a human. In some embodiments, the wearable multi-layer protective device is configured to encompass and/or cover at least a part the forearm of a person. FIGS. 3A and 3B show views of one embodiment of a wearable multi-layer protective device 300 that at least includes a multi-layered protective covering 200 as described herein.

The wearable multi-layer protective device 300 shown in FIGS. 3A and 3B can have a multi-layered protective covering 200 as described herein that is so dimensioned to cover at least a part and/or encompass the forearm of a human. One end 340 of the wearable multi-layer protective device 300 shown in FIGS. 3A and 3B can be configured to cover a hand or a first of the user when the device is in use. In some embodiments the end 340 configured to cover of the hand and/or first of the user when the device 300 is in use is rounded. In some embodiments, the body portion 310 can be made entirely of a multi-layered protective covering 200 described herein. In other embodiments, at least a part of the body portion 310 can be made of a multi-layered protective covering 200 described herein.

The wearable multi-layer protective device 300 can include two or more straps 320a,b . . . n (collectively 320). In operation the straps 320 can hold the wearable multi-layer protective device 300 in place. In some embodiments, the straps 320 can be attached to a body portion 310 of the wearable multi-layer protective device 300 and can be configured to wrap around the wearable multi-layer protective device 300 to secure the device 300 when in use. The straps 320 can include a suitable fastener and/or fastening mechanism. Suitable fasteners and/or fastening mechanisms include, but are not limited to hook and loop closures (e.g. Velcro® fasteners), snaps, buckles, or clips. Other suitable fasteners and/or fastening mechanisms will be appreciated by those in the art and are within the scope of this disclosure. The wearable multi-layer protective device 300 can have two or more guide and/or tension loops 330a,b . . . n (collectively 330). The guide and/or tension loops 330 can each be configured to receive and/or couple to one or more straps 320. The guide and/or tension loops 330 can be attached to the body portion 310 of the wearable multi-layer protective device 300. The guide and/or tension loops 330 can be configured to allow one or more straps 320 to feed through the loop(s) 330 and keeping strap(s) 320 in a desired position and/or provide a loop to tension the strap(s) 320 around keeping the strap(s) at a desired tension when the wearable multi-layer protective device 300 is in use.

Figure 4:
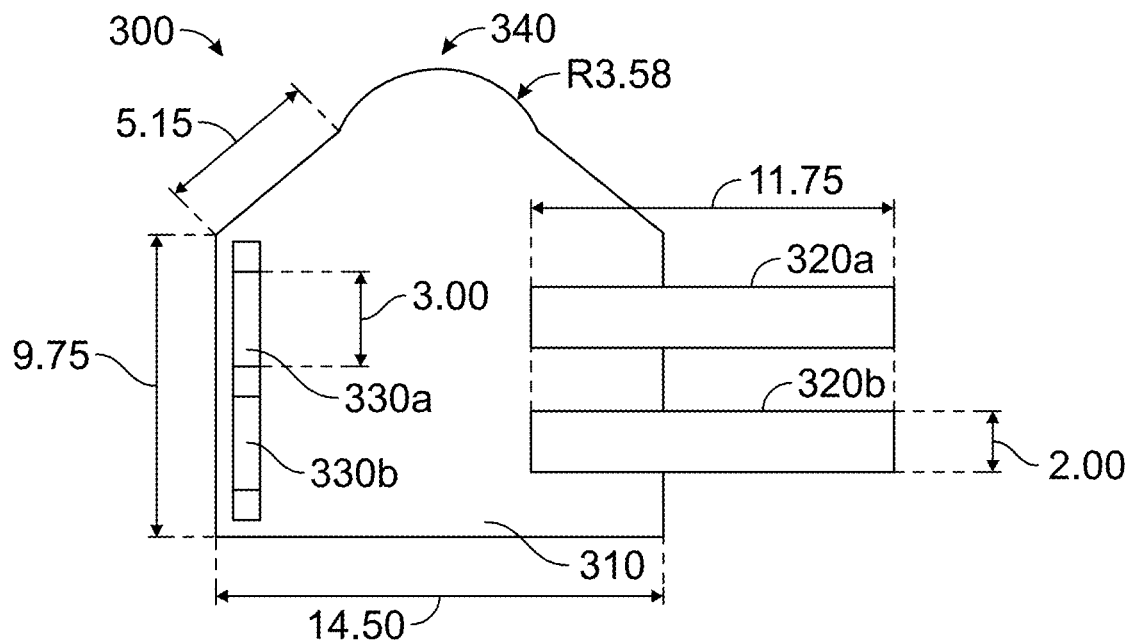
FIG. 4 shows a view of one embodiment of the wearable multi-layer protective device of FIGS. 3A and 3B with example dimensions shown. All dimensions shown in FIG. 4 are approximate and are in inches.

FIG. shows a view of one embodiment of the wearable multi-layer protective device of FIGS. 3A and 3B with example dimensions shown. All dimensions shown in FIG. 4 are approximate and are in inches. Other embodiments can have different sizes for the various components based on the size of the forearm of the user. Table 1 provides example sizing for a multi-layer protective device configured to protect the arm of a user. Other sizes can be easily constructed based on a dimension of a body part by those of ordinary skill in the art without undue experimentation and are thus within the scope of this disclosure.

TABLE 1

|  | Small/Medium | Large/X-Large |
| --- | --- | --- |
| Wrist Circumference | 6"-7.5" | 7"-8.5" |
| Forearm Circumference | 12"-13.75" | 13.5"-15" |

Figure 5A:
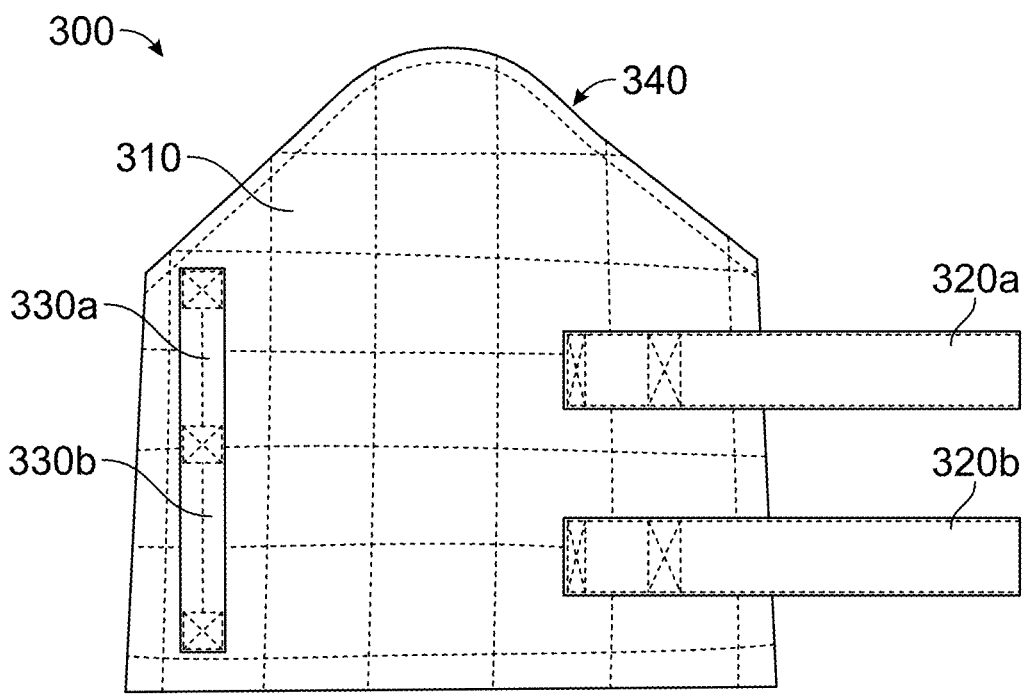
FIGS. 5A and 5B shows additional embodiments of the wearable multi-layer protective device of FIGS. 3A and 3B demonstrating the configuration of the device in an open position (FIG. 5A) and in a closed position (FIG. 5B).
Figure 5B:
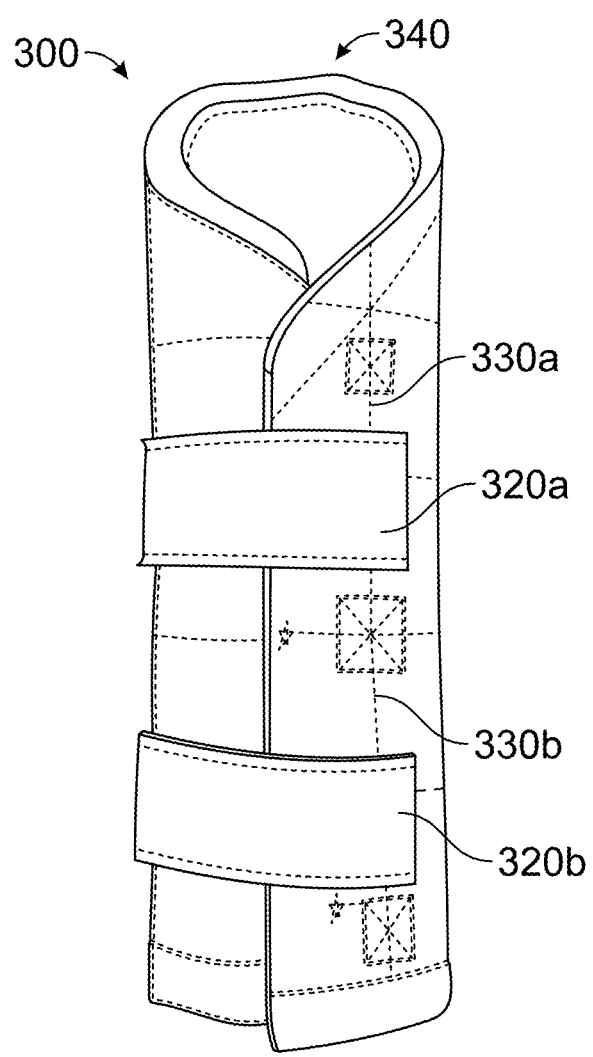

FIGS. 5A and 5B shows additional embodiments of the wearable multi-layer protective device of FIGS. 3A and 3B demonstrating the configuration of the device in an open position (FIG. 5A) and in a closed position (FIG. 5B). In some embodiments, the wearable multi-layer protective device can include additional stitching (dashed lines on the body portion 310 of the device 300). This stitching can function to prevent slipping of one or more of the layers of the wearable multi-layer protective device 300 and/or provide additional comfort to the user.

Figure 6A:
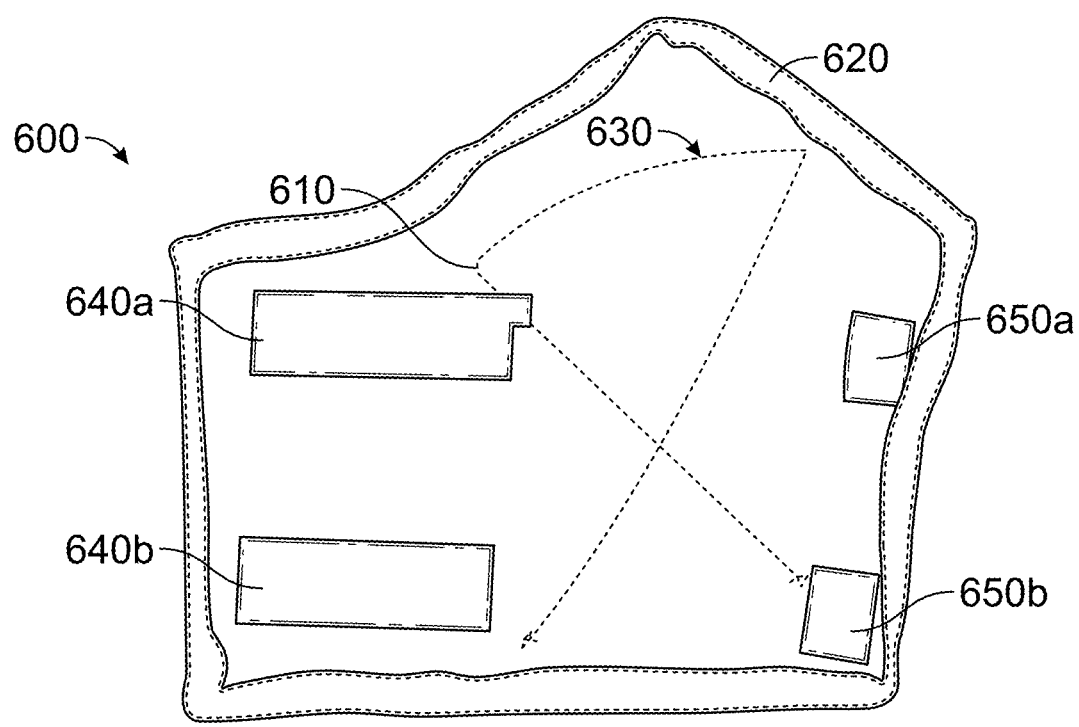
FIGS. 6A and 6B show additional embodiments of a wearable multi-layer protective device having a multilayered protective covering.
Figure 6B:
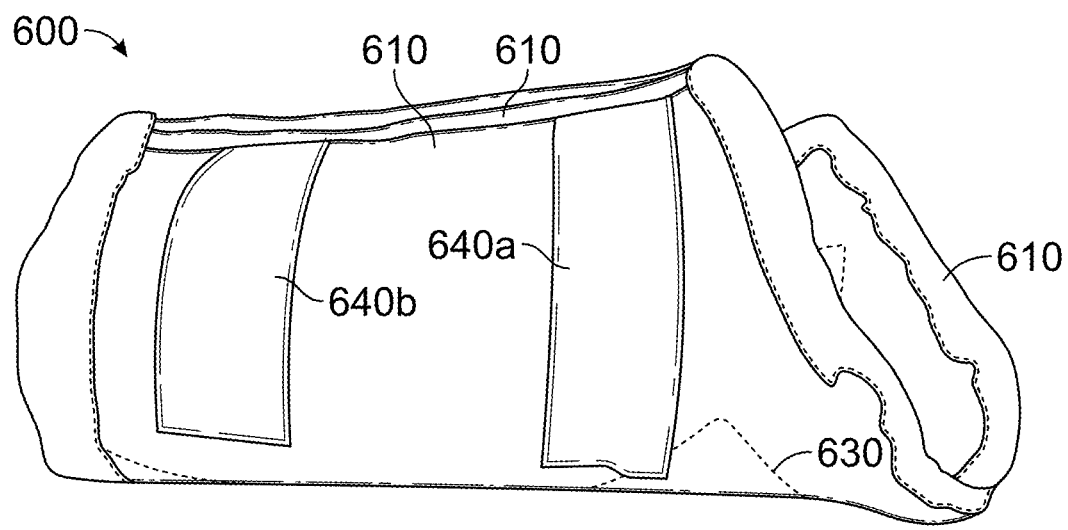

FIGS. 6A-6B show additional embodiments of a wearable multi-layer protective device 600 having a multilayered protective covering 200. FIGS. 6A and 6B demonstrate the device 600 in an open position (FIG. 6A) and a closed position (FIG. 6B). The wearable multi-layer protective device 600 can have optional edging material 620 surrounding the edges of the multilayer protective covering 200 described herein. Suitable edging material includes, but is not limited to, jute, leather, neoprene, Condura® nylon, ballistic nylon, and combinations thereof. Although shown here, it will be appreciated that edging material 610 can be included in any of the wearable multi-layer protective devices or multi-layer protective coverings described herein.

The wearable multi-layer protective device 600 can include two or more straps 640a, b . . . n (collectively, 640). The straps 640 can be attached to a body portion 610 of the wearable multi-layer protective device 600. The multi-layer protective device 600 can include two or more strap holders 650a,b . . . n (collectively 650) attached to the body portion 610. In operation, the straps 640 can be coupled to strap holders 650 to secure the device 600 in place on a user. The straps 640 and/or strap holders 650 can be and/or include any suitable fastener or fastening mechanism configured to couple the straps 640 and strap holders 650. Suitable fastener or fastening mechanisms include, but are not limited to hook and loop closures (e.g. Velcro® fasteners), snaps, buckles, or clips. Other suitable fastener or fastening mechanism will be appreciated by those in the art.

As shown in FIG. 6A, the device can include quilting and/or stitching 630 in one or more of the layers. The quilting and/or stitching 630 can prevent movement of the layers of the device and/or bunching. The quilting and/or stitching 630 can provide comfort for the user. The quilting and/or stitching 630 can also provide decoration. The quilting and/or stitching 630 can be in any suitable pattern, which will be appreciated by those of skill in the art. Although shown here, it will be appreciated that quilting or stitching can be included in any of the wearable multi-layer protective device or multi-layer protective covering described herein. Other patterns of quilting are described elsewhere herein.

The body portion 610 can be any desirable shape. It will be appreciated that the shape and dimension of the body portion 610 can be determined by one of ordinary skill in the art so as to fit a body portion (e.g. arm or leg) of a user. The body portion 610 can be made essentially of the multi-layered protective covering 200 described herein. In other embodiments, at least a portion of the body portion 610 can be made of the multi-layered protective covering 200 described herein.

Figure 7:
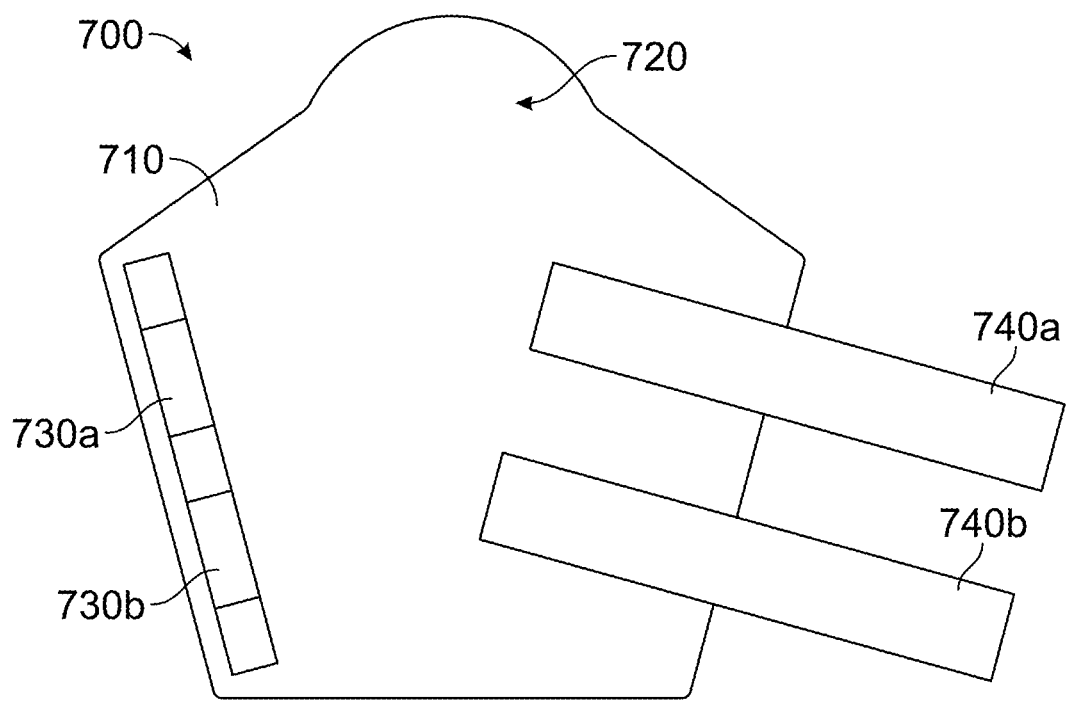
FIG. 7 shows another embodiment of a wearable multi-layer protective device having a multilayered protective covering as described herein.

FIG. 7 shows another embodiment of a wearable multi-layer protective device 700 having a multilayered protective covering 200 as described herein. The wearable multi-layer protective device 700 can be configured to be used on the arm of a human. The wearable multi-layer protective device 700 can have a multi-layered protective covering 200 as described herein that is so dimensioned to cover at least a part of and/or encompass the forearm of a human. One end 720 of the body portion 710 of wearable multi-layer protective device 700 can be configured to cover a hand and/or a first of the user when the device 700 is in use. In some embodiments the end 720 can be configured to cover of the hand and/or first of the user when the device 700 is in use is rounded. In some embodiments, the body portion 710 can be made entirely of a multi-layered protective covering 200 described herein. In other embodiments, at least a part of the body portion 710 can be made of a multi-layered protective covering 200 described herein.

The wearable multi-layer protective device 700 can include two or more straps 740a,b . . . n (collectively 740). In operation the straps 740 can hold the wearable multi-layer protective device 700 in place. In some embodiments, the straps 740 can be attached to a body portion 710 of the wearable multi-layer protective device 700 and can be configured to wrap around the wearable multi-layer protective device 700 to secure the device 700 when in use. The straps 740 can include a suitable fastener and/or fastening mechanism. Suitable fasteners and/or fastening mechanisms include, but are not limited to hook and loop closures (e.g. Velcro® fasteners), snaps, buckles, or clips. Other suitable fasteners and/or fastening mechanisms will be appreciated by those in the art and are within the scope of this disclosure.

The wearable multi-layer protective device 700 can have two or more guide and/or tension loops 730a, b . . . n (collectively 730). The guide and/or tension loops 730 can each be configured to receive and/or couple to one or more strap(s) 740. The guide and/or tension loops 730 can be attached to the body portion 710 of the wearable multi-layer protective device 700. The guide and/or tension loops 730 can be configured to allow one or more straps 740 to feed through the loop(s) 730 and keeping strap(s) 740 in a desired position and/or provide a loop to tension the strap(s) 740 around keeping the strap(s) at a desired tension when the wearable multi-layer protective device 700 is in use.

Figure 8:
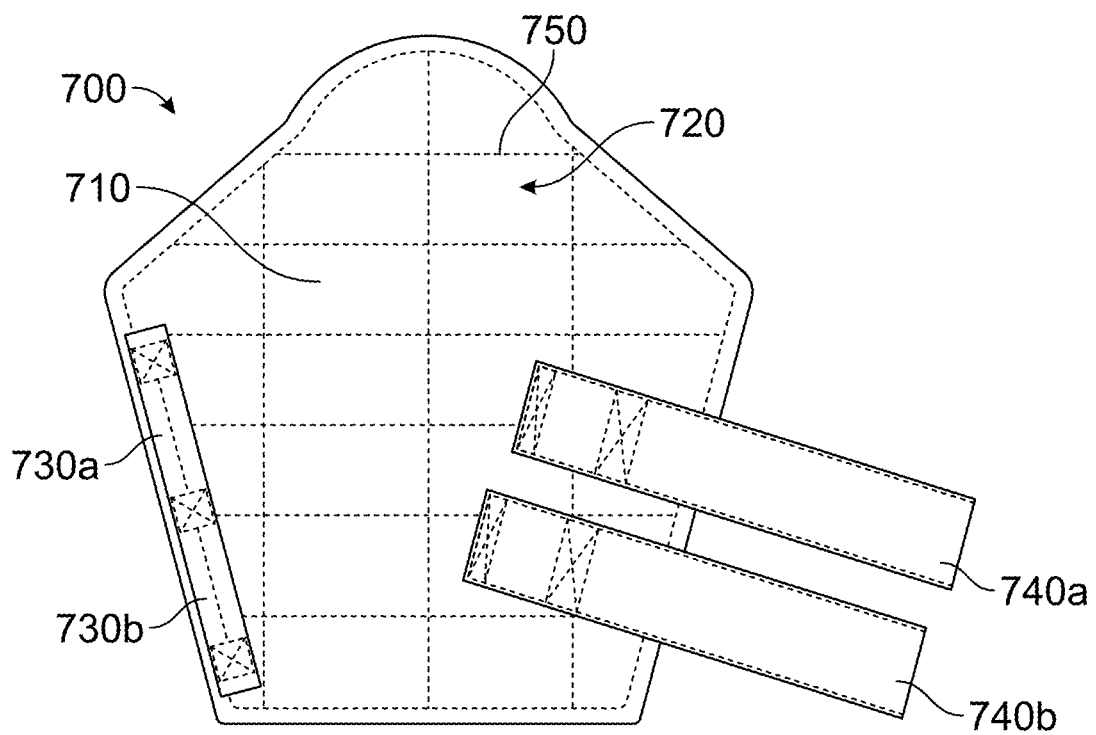
FIG. 8 shows another embodiment of the wearable multi-layer protective device shown in FIG. 7.

FIG. 8 shows another embodiment of the wearable multi-layer protective device shown in FIG. 7. As shown in FIG. 8, in some embodiments, the body portion 710 can include additional stitching and/or quilting 750. The quilting and/or stitching 750 can prevent movement of the layers of the device and/or bunching. The quilting and/or stitching 750 can provide comfort for the user. The quilting and/or stitching 750 can also provide decoration. The quilting and/or stitching 750 can be in any suitable pattern, which will be appreciated by those of skill in the art. Although shown here, it will be appreciated that quilting or stitching can be included in any of the wearable multi-layer protective device or multi-layer protective covering described herein. Other patterns of quilting are described elsewhere herein.

Figure 9A:
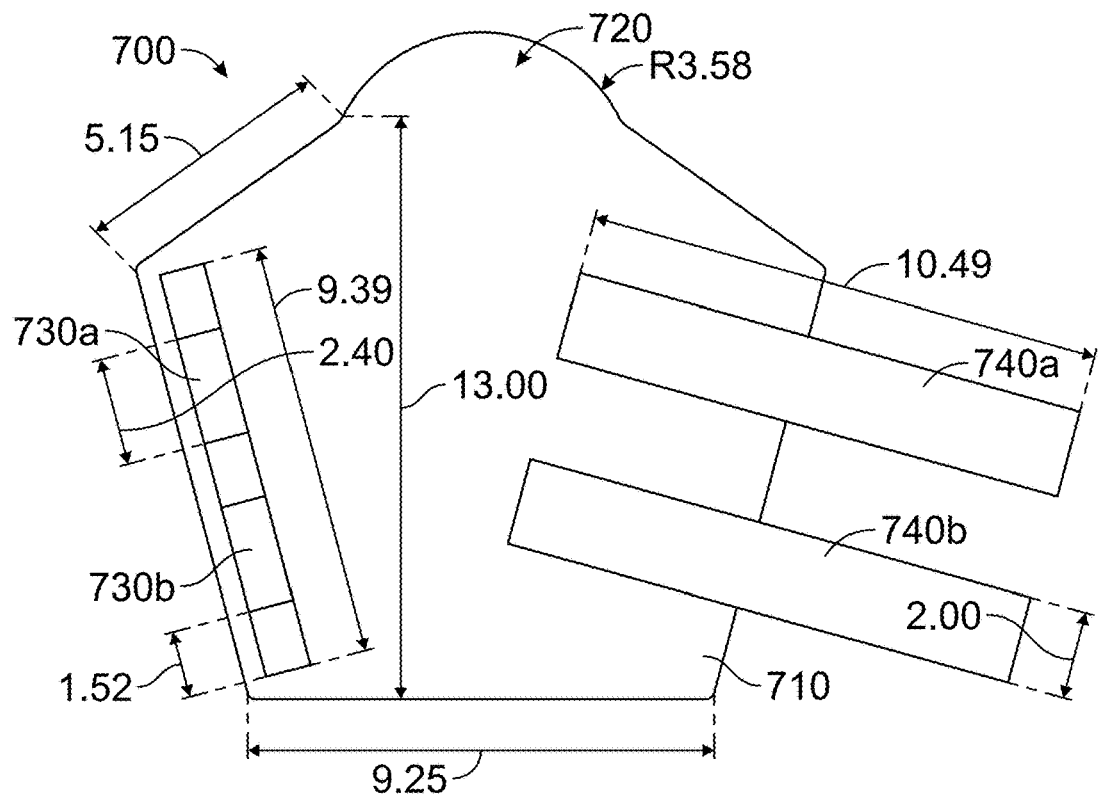
FIGS. 9A and 9B show views of one embodiment of the wearable multi-layer protective device of FIGS. 7-8 with example dimensions shown. All dimensions shown in FIGS. 9A-9B are approximate and are in inches.
Figure 9B:
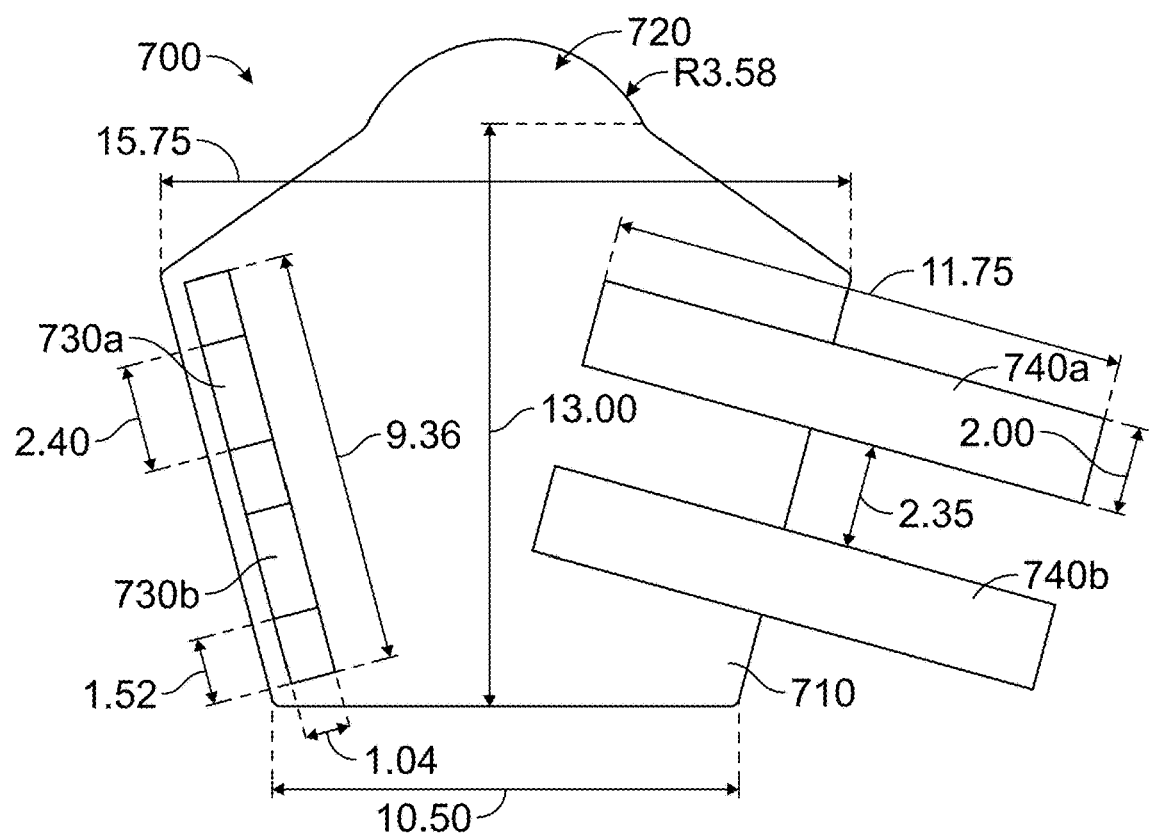

FIGS. 9A and 9B show technical specifications demonstrating the sizing for a small size (FIG. 9A) and a large size (FIG. 9B) of the wearable multi-layer protective device of FIGS. 7 and 8. To provide a context for the sizes, a muscular male canine trainer would typically wear the large or extra-large sized device.

Figure 10:
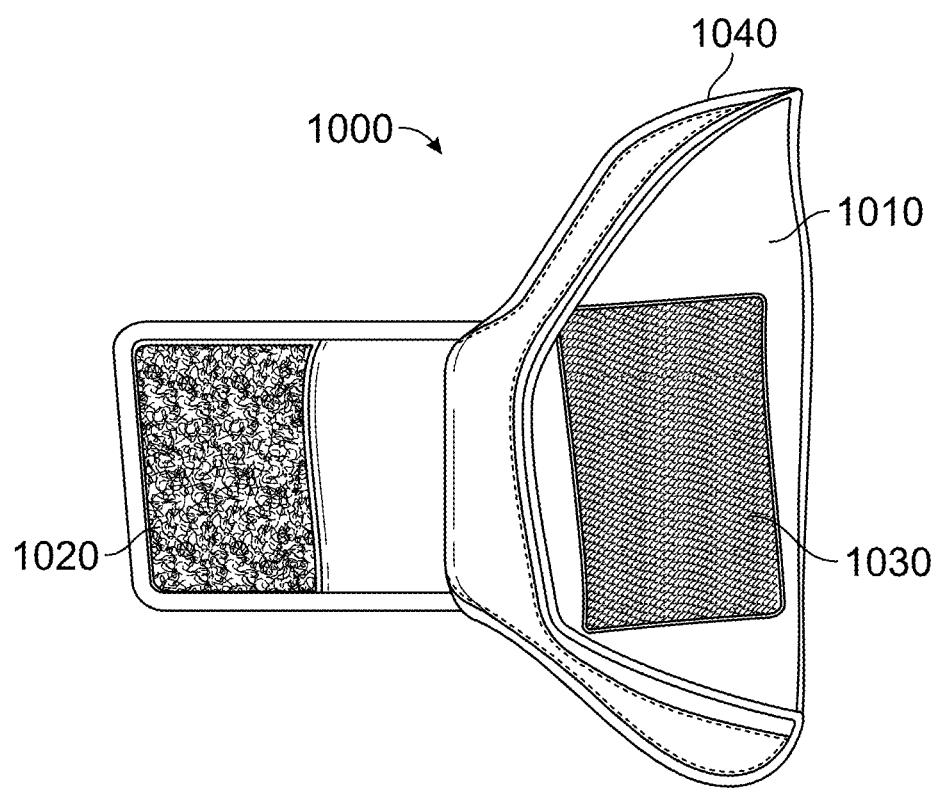
FIG. 10 shows a further embodiment of a wearable multi-layer protective device having a multilayered protective covering as described herein.

FIG. 10 shows a further embodiment of a wearable multi-layer protective device 1000 having a multilayered protective covering as described herein. Embodiments of the wearable multi-layer protective device 1000 can be configured to cover at least a part of and/or encompass a forearm of a user. The wearable multi-layered protective device 1000 can have a body portion 1010. The body portion 1010 can be any desirable shape. It will be appreciated that the shape and dimension of the body portion 1010 can be determined by one of ordinary skill in the art so as to fit a body portion (e.g. arm or leg) of a user.

The wearable multi-layer protective device 1000 can include be a single strap 1020 and a strap holder 1030. The strap holder 130 can be attached to the body portion 1010 of the wearable multi-layer protective device 1000. The strap 1020 can be configured to couple to the strap holder 1030. In operation the strap 1020 can be coupled to the strap holder 1030 to connect two ends of the device 1000 and/or hold the device in place on the user. The strap 1010 and/or strap holder 1030 can include or be any suitable fastener or fastening mechanism. Suitable fastener or fastening mechanisms include, but are not limited to hook and loop closures (e.g. Velcro® fasteners), snaps, buckles, or clips. Other suitable fastener or fastening mechanism will be appreciated by those in the art. The wearable multi-layer protective device 1000 can also include edging material 1040. The edging material can be attached to the body portion 1040 at least at one edge of the body portion 1040. In some embodiments, the body portion 1010 can be made entirely of a multi-layered protective covering 200 described herein. In other embodiments, at least a part of the body portion 1010 can be made of a multi-layered protective covering 200 described herein.

Figure 11A:
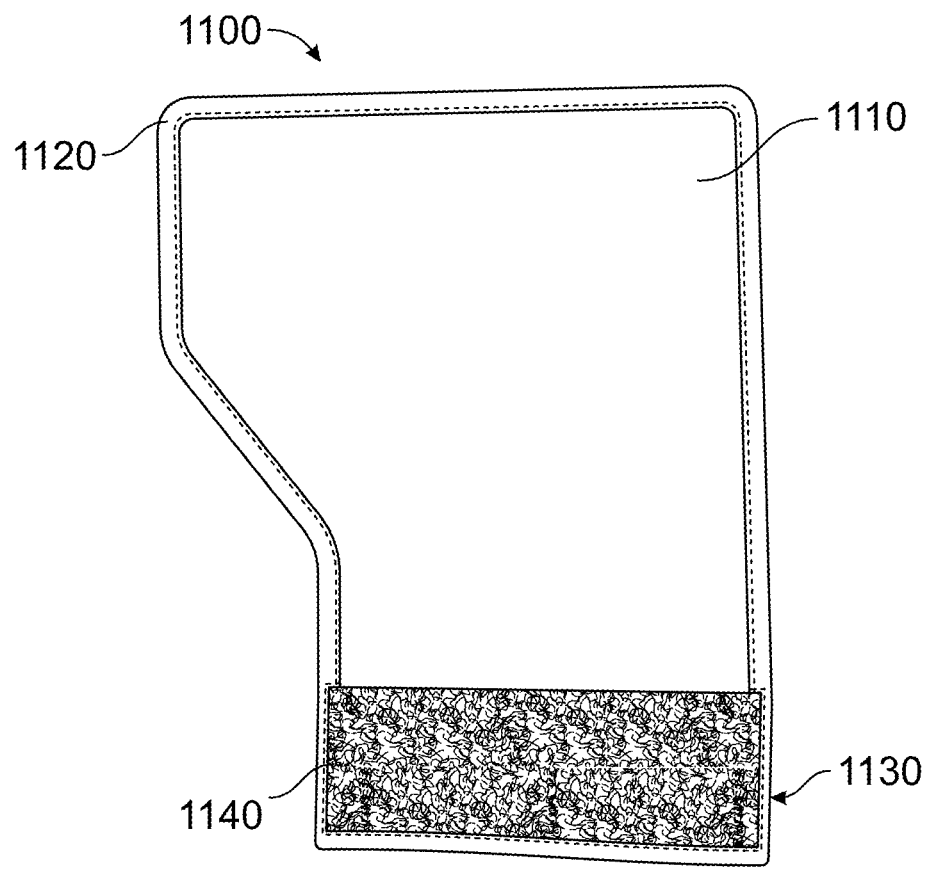
FIGS. 11A-11D show different views of additional embodiments of a wearable multi-layer protective device having a multilayered protective covering in an open position (FIGS. 11A and C) and a closed position (FIGS. 11B and D).
Figure 11B:
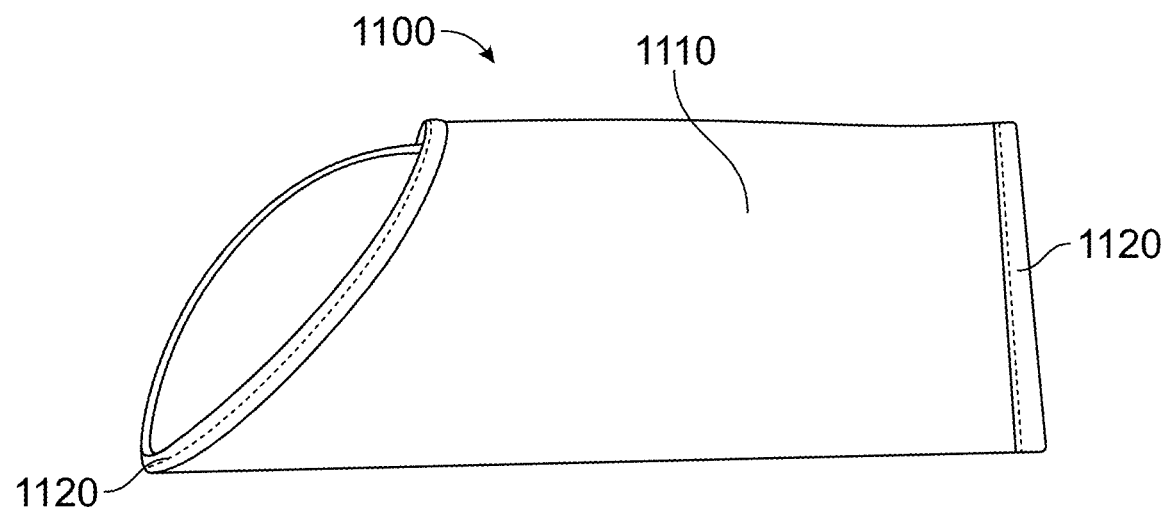

FIGS. 11A-11D show different views of additional embodiments of a wearable multi-layer protective device 1100 having a multilayered protective covering 2000 in an open position (FIGS. 11A and C) and a closed position (FIGS. 11B and D). The wearable multi-layered protective device 1000 can have a body portion 1010. The body portion 1010 can be any desirable shape. It will be appreciated that the shape and dimension of the body portion 1010 can be determined by one of ordinary skill in the art so as to fit a body portion (e.g. arm or leg) of a user.

As shown in FIGS. 11A-11D, the wearable multi-layer protective device 1100 can have an integrated tab 1110 that can be integrated with the body portion 1110 of the device 1100 can be configured to couple one side of the device to the other when in use. The integrated tab 1110 can include a suitable fastener, fastening mechanism, or portion thereof 1140. The fastener, fastening mechanism, or portion thereof 1140 can be attached to the integrated tab 1110 Suitable fastener or fastening mechanisms include, but are not limited to hook and loop closures (e.g. Velcro® fasteners), snaps, buckles, or clips. Other suitable fastener or fastening mechanism will be appreciated by those in the art. The integrated tab can be any desirable size.

The wearable multi-layer protective device 1100 can also include edging material 1120. The edging material can be attached to the body portion 1010 and/or integrated tab 1130 at least at one edge of the body portion 10101 and/or integrated tab 1130. In some embodiments, the body portion 1110 can be made entirely of a multi-layered protective covering 200 described herein. In other embodiments, at least a part of the body portion 1110 can be made of a multi-layered protective covering 200 described herein.

Figure 11C:
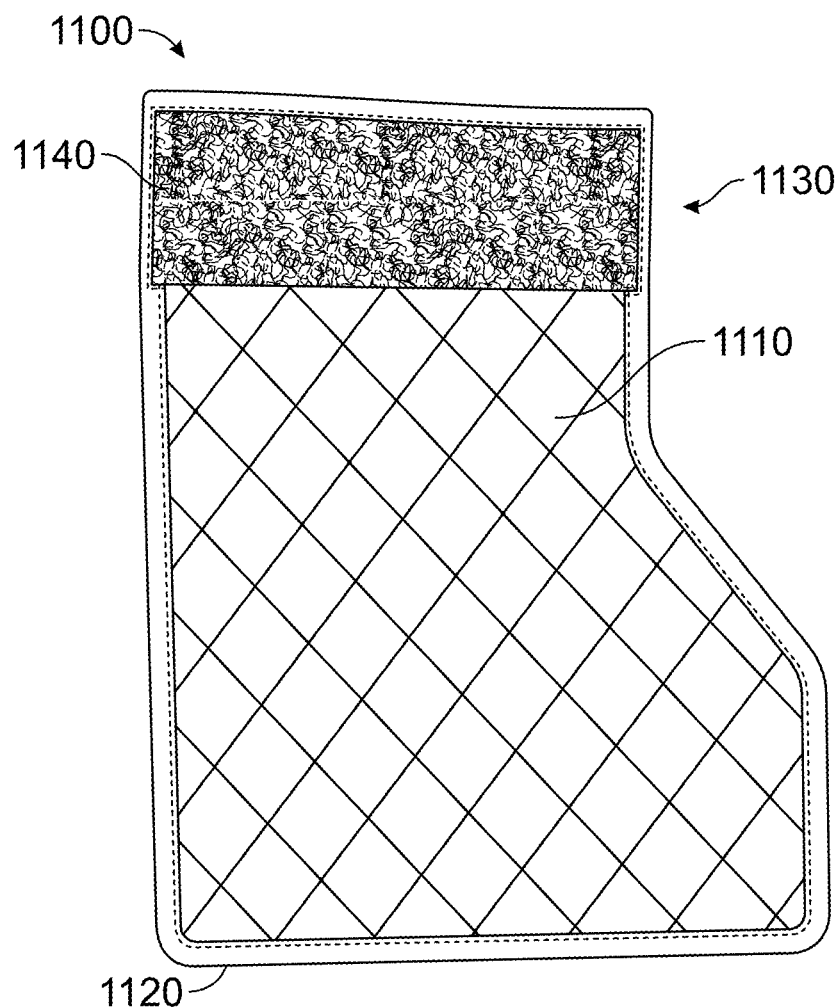
Figure 11D:
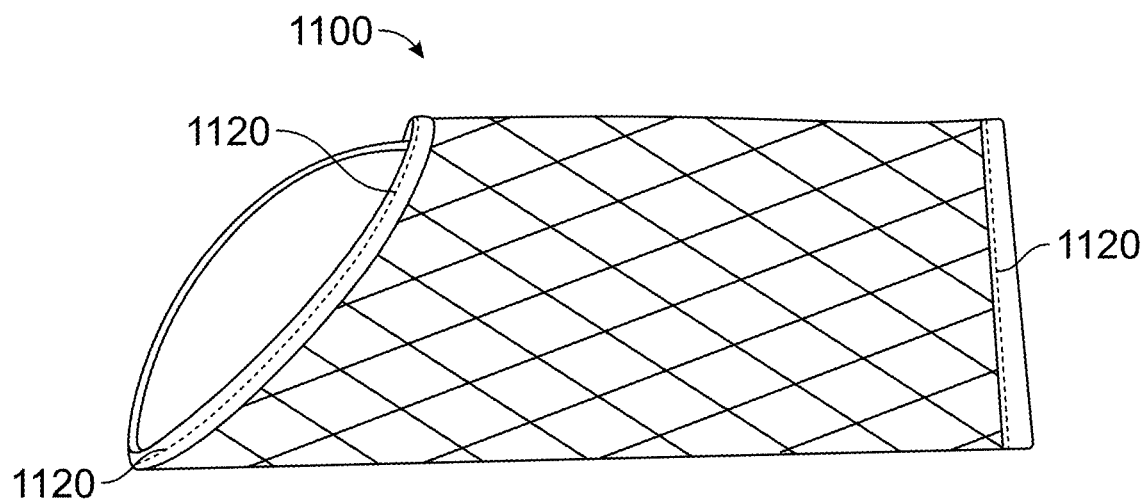

FIGS. 11C and 11D show the device of FIGS. 11A and 11B with optional quilting and/or stitching (solid lines on the body portion 1110). The quilting and/or stitching can prevent movement of the layers of the device and/or bunching. The quilting and/or stitching can provide comfort for the user. The quilting and/or stitching can also provide decoration. The quilting and/or stitching can be in any suitable pattern, which will be appreciated by those of skill in the art. Although shown here, it will be appreciated that quilting or stitching can be included in any of the wearable multi-layer protective device or multi-layer protective covering described herein. Other patterns of quilting are described elsewhere herein.

With the embodiments of the wearable multilayered protection device configured to cover at least a part of and/or encompass the forearm of a user described, attention is now turned to FIGS. 12A-22B, which show embodiments of wearable multilayered protection device configured to cover at least a part of and/or encompass the forearm, elbow, and upper arm of a user. Discussion of the embodiments of full-arm wearable multilayered protection devices begins with FIGS. 12A-12B, which show embodiments of a full-arm wearable multilayered protection device.

Figure 12A:
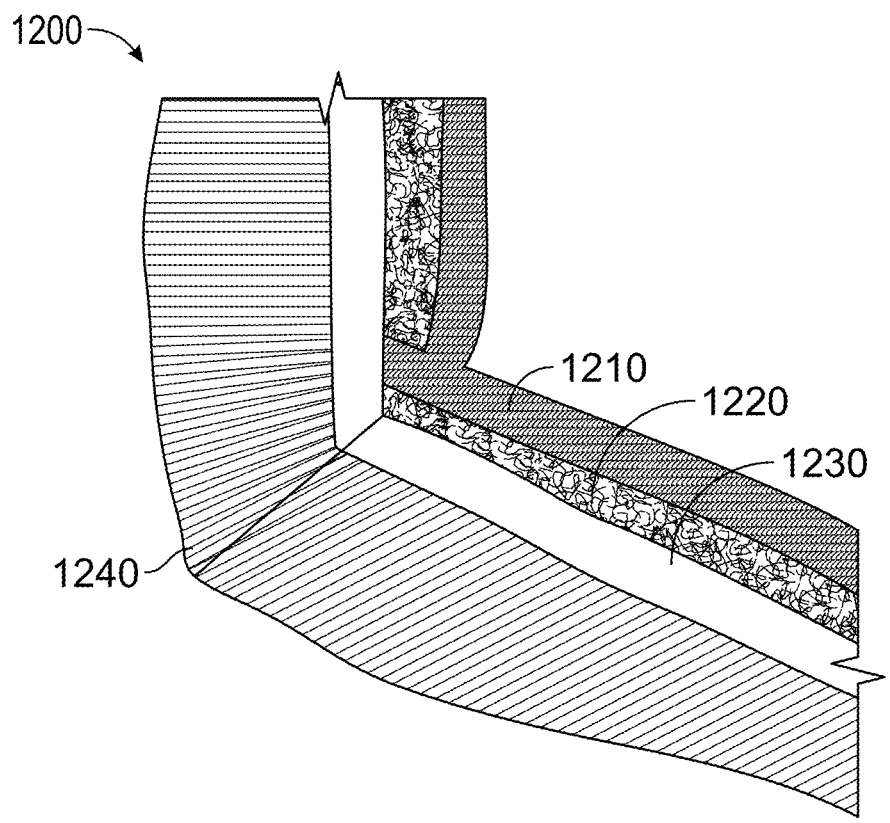
FIGS. 12A-12B show views of an additional embodiment of a wearable multilayered protection device that can be configured to cover a full arm of a user.
Figure 12B:
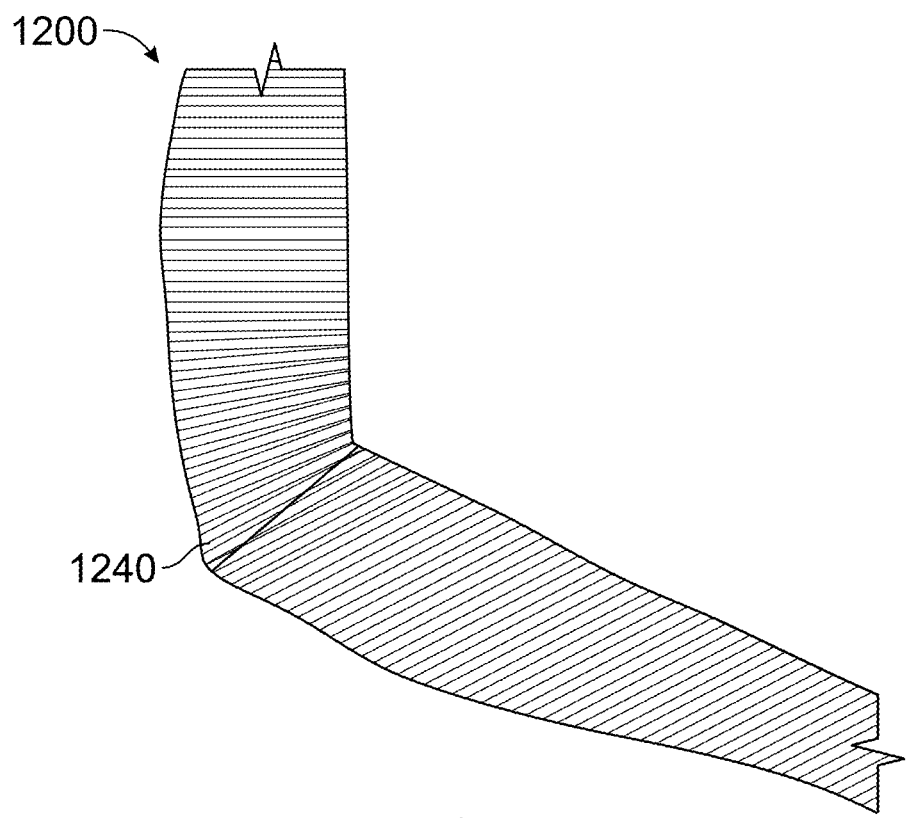

FIGS. 12A-12B show views of an additional embodiment of a wearable multilayered protection device that can be configured to cover a full arm of a user. FIG. 12A shows a cutaway view demonstrating various layers of the device 1200 shown in FIG. 12B. The optional skin-simulating layer is not shown. In the embodiments shown in FIGS. 12A-12B, the wearable multi-layer protective device 1200 is essentially a multi-layered protective covering 200 as described herein that is configured as a sleeve. In operation, a user can put the device on an arm (as shown) or leg by simply sliding the sleeve over the limb. In other words, the body portion of the device 1200 can be a sleeve made essentially of a multi-layered protective covering 200 as described herein.

As shown in FIG. 12A, the multi-layered protective covering 200 that forms a body of the wearable multi-layered protective device 1200 can include the removable sixth flexible layer 1240. The first through the fourth flexible layers of the multi-layered protective covering 1220 can thus be separated from the removable sixth flexible layer 1240 as desired, such as, but not limited to, when the sixth flexible layer 1240 is worn out and needs replacement. In embodiments, a first fastener 1210 can be attached to at least one of the first through the fourth flexible layers of the multi-layered protective covering 1220. A second fastener 1230 can be coupled to the removable sixth flexible layer 1240. The first and the second fasteners (1210, 1230) can be attached at any position on the layers. As shown in FIG. 12A, in some embodiments, the fasteners (1210, 1230) can run the length of the device 1200. The first fastener 1210 can be configured to couple to the second fastener 1230. In operation the first fastener can be coupled to the second fastener 1230 to secure the optional sixth layer to the other layers 1210 of the device. In embodiments, the first and second fasteners 1210, 1230 can be and/or form together a hook and loop fastener (e.g. Velcro® fastener).

FIG. 12A shows a cross-section of a full-arm wearable multilayered protection device. An optional removable skin-simulating layer is not shown. The embodiments depicted in FIGS. 12A-12B can be fastened with a suitable fastener or fastening mechanism (e.g. Velcro® fastener) 1220 along a portion of or the entire longitudinal length. In other embodiments, the full-arm wearable multilayered protection device can be sewn or otherwise permanently attached along its longitudinal length, and no fastener is needed. In these embodiments, the user can put the device on by sliding the arm into the sleeve. FIG. 12B shows the embodiments described with respect to FIG. 12A when in use.

FIGS. 13A-13E show several views of an additional embodiment of a wearable multilayered protection device 1300 having one or more sections that can be made of or include the multi-layered protective covering on the arm of a user. The skin simulating outer layer is not shown. In these embodiments, the wearable multilayered protection device 1300 can have three distinct sections: a forearm section 1340, an elbow section 1330, and an upper arm section 1320. Each section can be configured to cover and/or encompass at least those respective areas of the arm of a user 1310.

Figure 13A:
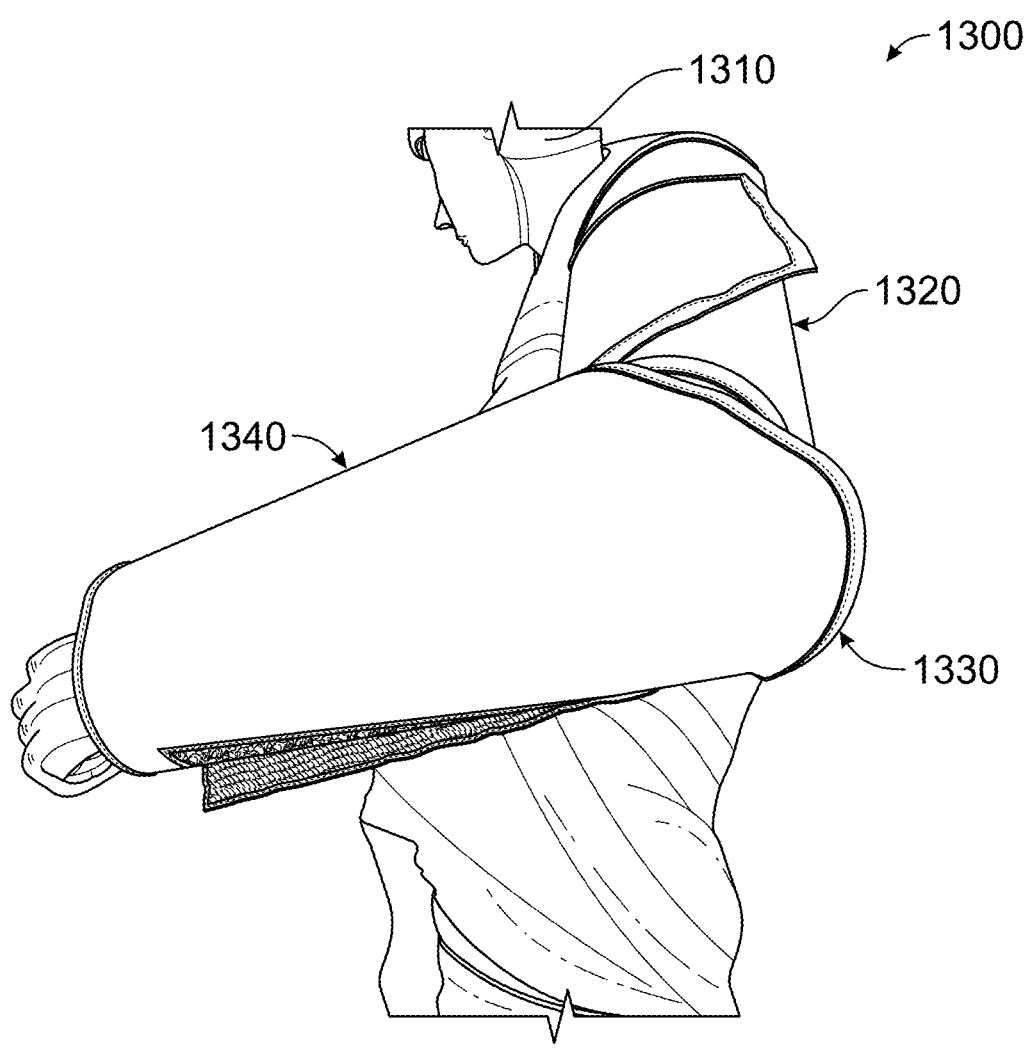
FIGS. 13A-13E show several views of an additional embodiment of a wearable multilayered protection device having one or more sections that can be made of or include the multi-layered protective covering on the arm of a user.
Figure 13B:
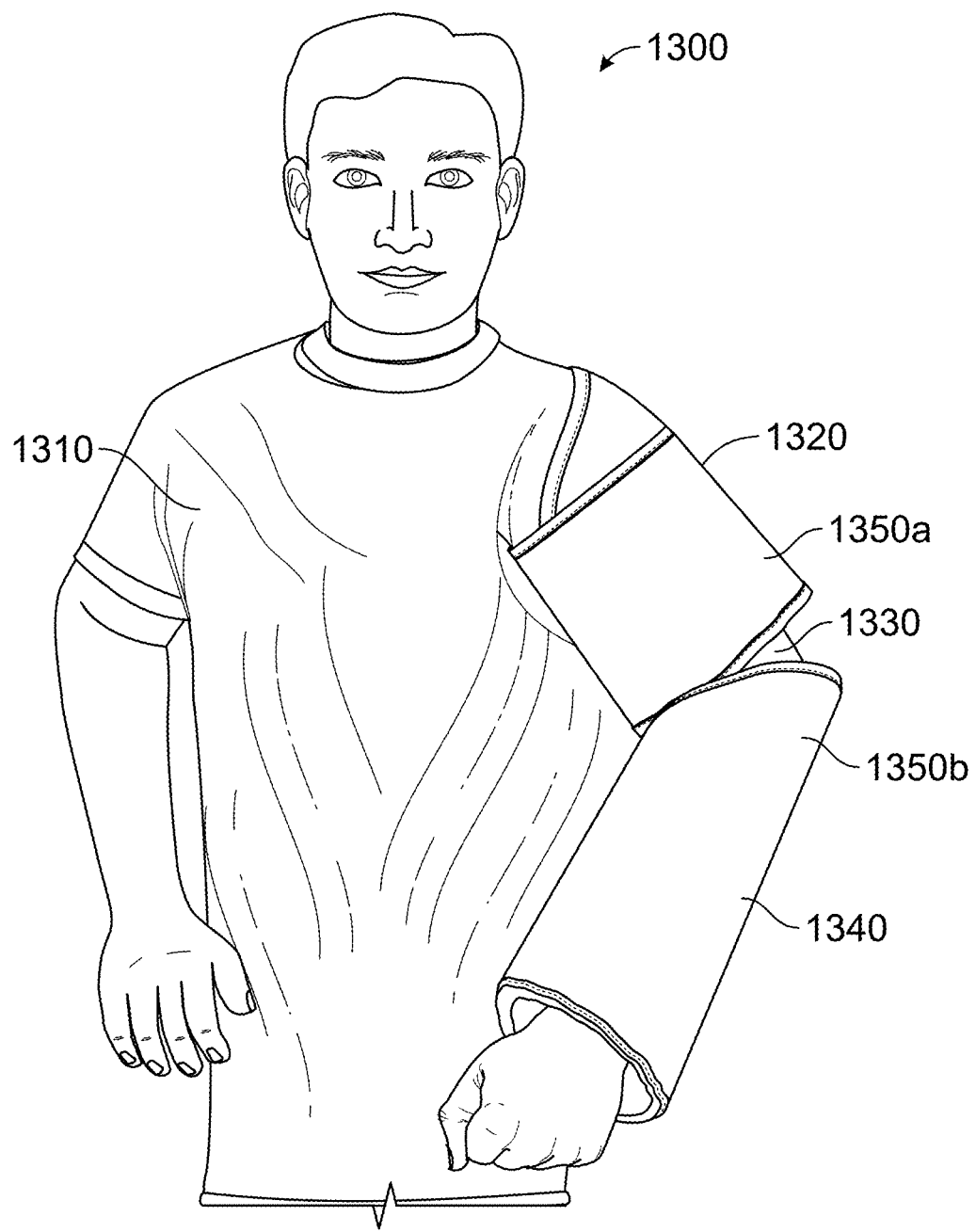
Figure 13C:
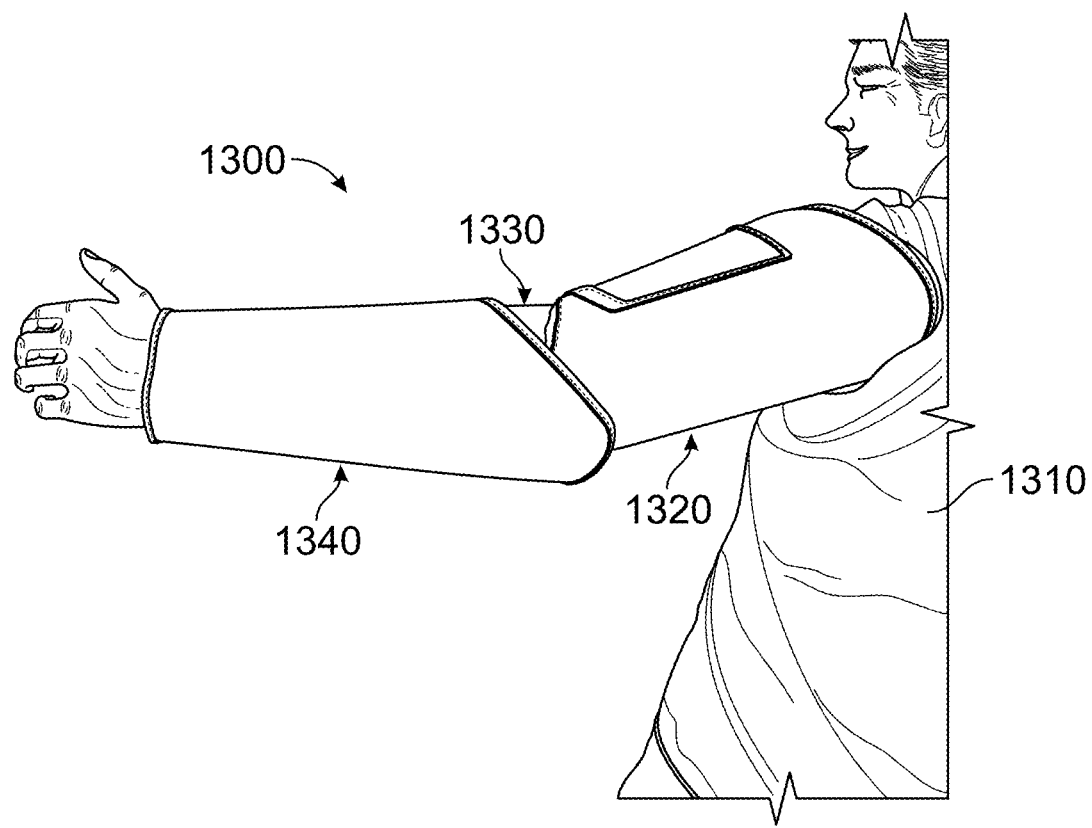
Figure 13D:
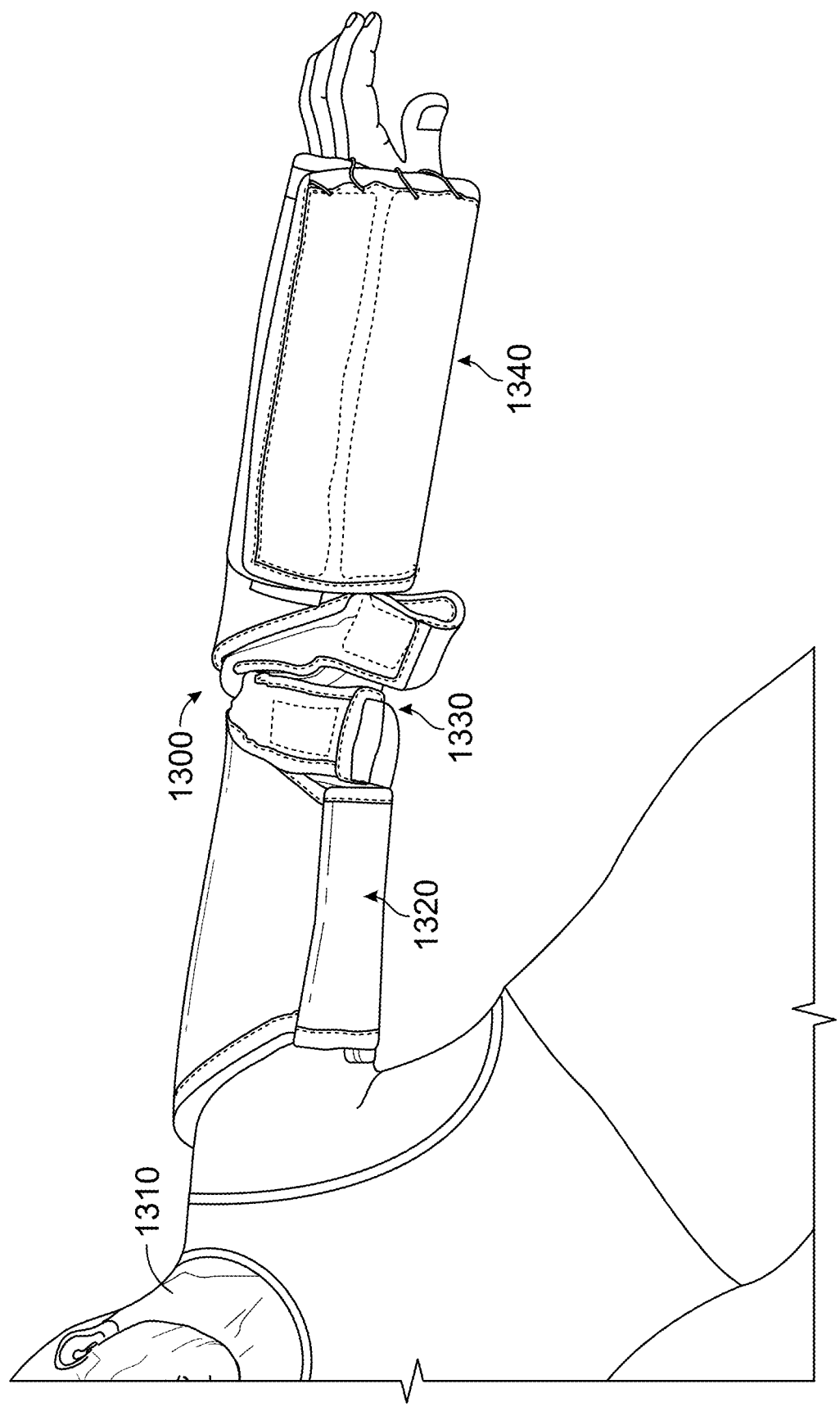
Figure 13E:
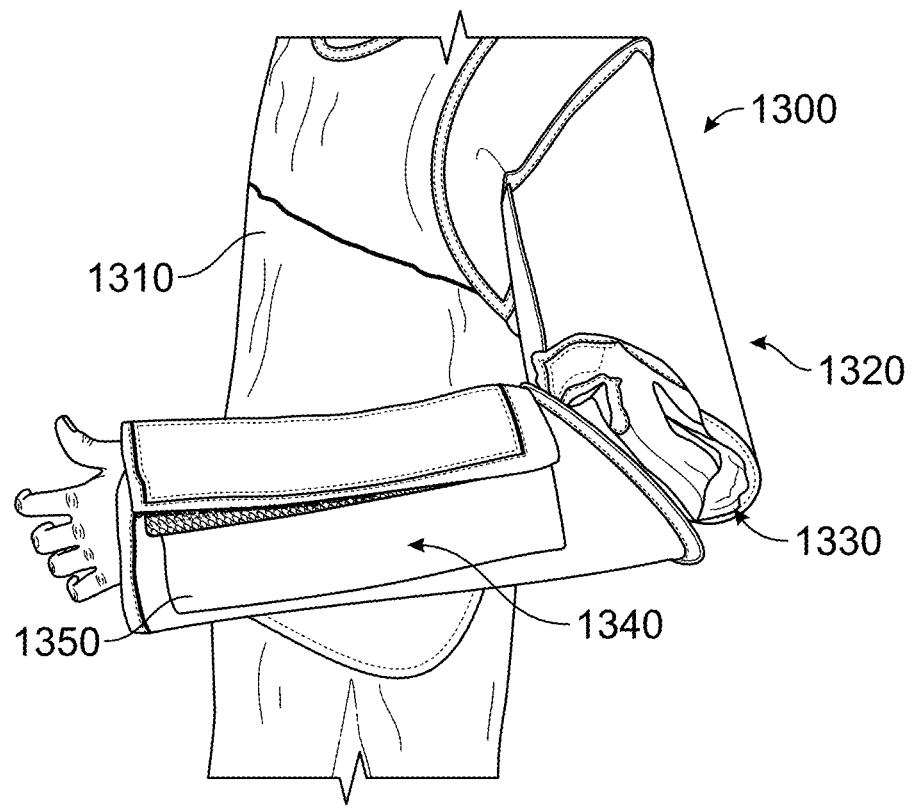

There can be overlap between sections so as to provide protection throughout the entire range of motion of the user 1310. For example, as is demonstrated in FIG. 13C, the forearm section 1340 can have a proximal end configured to overlaps the elbow section when the arm of the user 1310 is extended. The forearm section 1340 can have a distal end configured to cover the hand of a user 1310. Similarly, the upper arm section 1320 can have a distal end that is configured to provide coverage to the elbow of the user. The upper arm section 1320 can have a proximal end that is configured to cover the shoulder area of the user 1310. As shown in FIG. 13D, the elbow section 1330 can be configured to allow bending of the elbow when in use. This is described in greater detail with reference to FIG. 14.

In some embodiments, the body portions 1350 a, b (collectively 1350) of the forearm section 1340 and the upper arm section 1320 can be made essentially of the multi-layered protective covering 200. In some embodiments, the body portions 1350a, b (collectively 1350) of the forearm section 1340 and the upper arm section 1320 can have at least a portion that is made of the multi-layered protective covering 200. Some or all portions of the elbow section 1330 can be made of the multi-layered protective covering 200.

Figure 14:
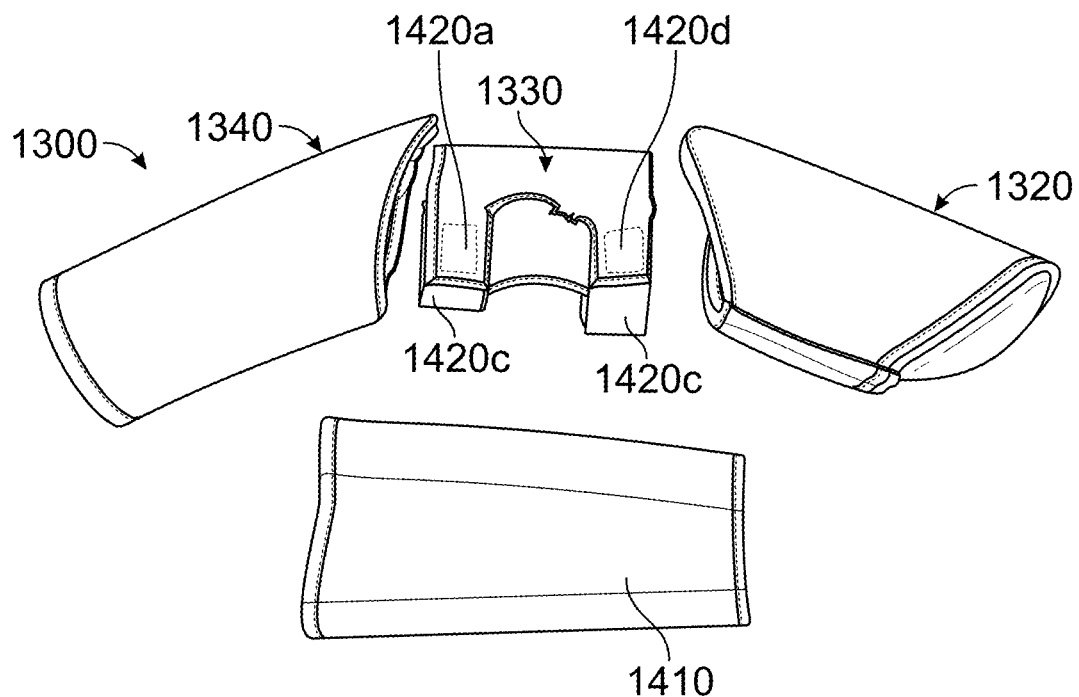
FIG. 14 shows the various sections of the wearable multilayered protection device of FIGS. 13A-13E and further shows a removable skin simulating outer layer.
Figure 15A:
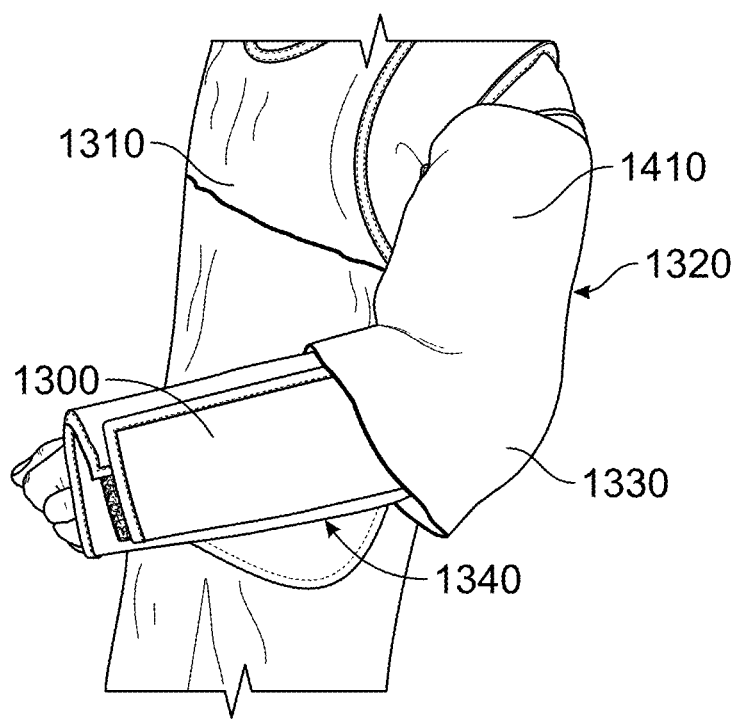
FIGS. 15A-15D show the full-arm wearable multilayered protection device of FIGS. 13A-13E in use with the removable skin simulating outer layer partially covering (FIGS. 15A, 15C, and 15D) and fully covering (FIG. 15B) the full-arm wearable multilayered protection device.
Figure 15B:
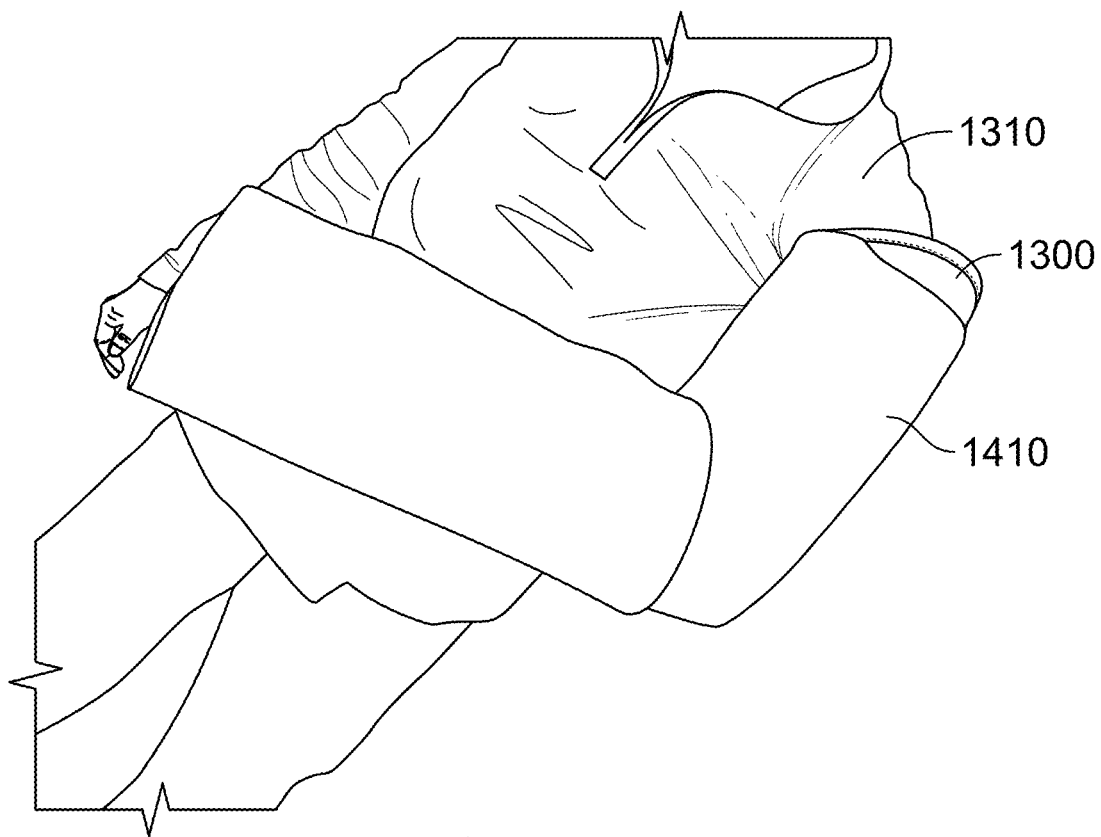
Figure 15C:
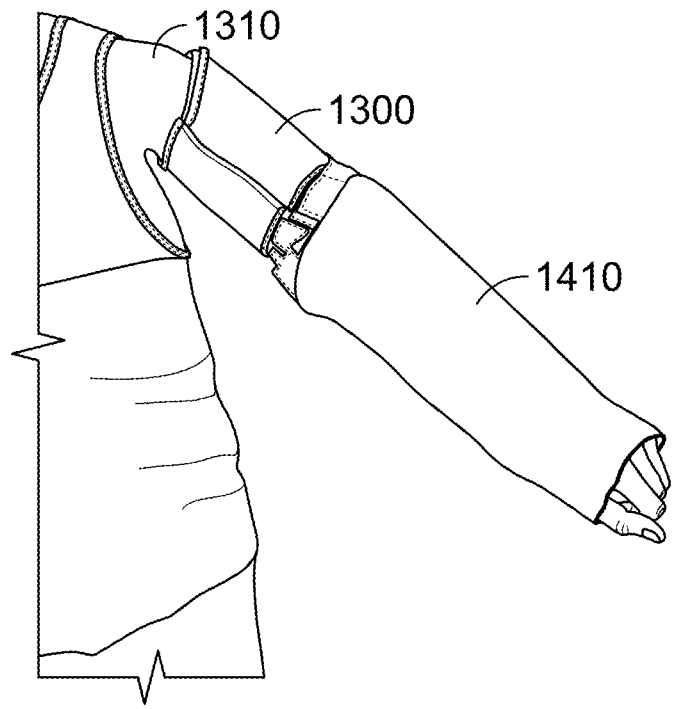
Figure 15D:
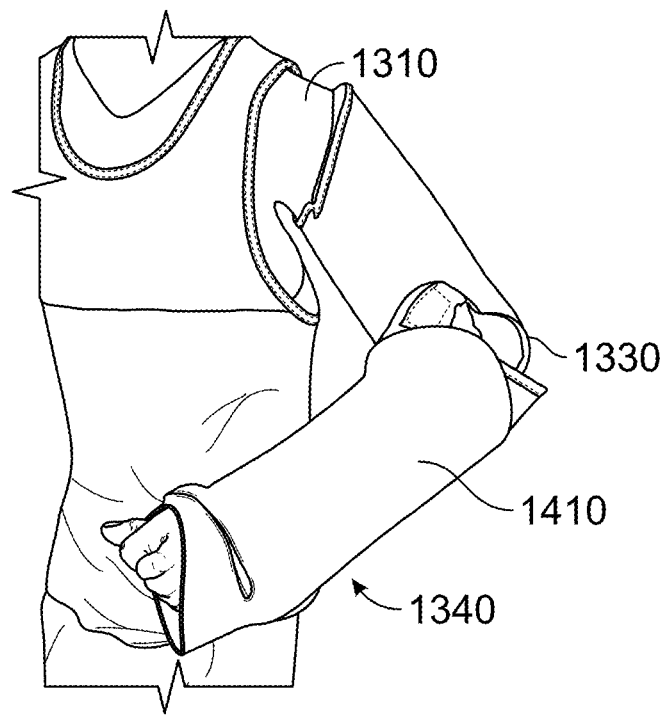

FIG. 14 shows the various sections of the wearable multilayered protection device 1300 of FIGS. 13A-13E and further shows a removable skin simulating outer layer 1410. The forearm section 1340 can have a proximal end configured to overlaps the elbow section when the arm of the user

1310 is extended. The forearm section 1340 can have a distal end configured to cover the hand of a user 1310. Similarly, the upper arm section 1320 can have a distal end that is configured to provide coverage to the elbow of the user. The upper arm section 1320 can have a proximal end that is configured to cover the shoulder area of the user 1310. In some embodiments, the forearm section 1340 and/or the upper arm section 1320 can be configured as a sleeve that can slip over the arm of a user 1310. In some embodiments, the forearm section 1340 and/or the upper arm section 1320 can include one or more tabs, straps, and/or other fasteners that can allow the sections to be wrapped around at least a portion of the arm of the user 1310 and capable of securing the sections 1320, 1340 in place on the arm by the tabs, straps, and/or other fasteners.

The elbow section 1330 can be essentially "H" shaped when in the open position with the arms and legs of the "H" forming four strap portions (1420a,b,c,d) that can be coupled to each other as shown in e.g. FIG. 14. This "H" configuration allows a gap to be present when in the closed position to allow for movement of the elbow without bunching of material when in use. In operation, the elbow section 1330 can be positioned on the user such that the straps are attached to each other on the inside of the elbow (see e.g. FIG. 13D). In operation, the removable skin simulating outer layer 1410 can be slide over the other three sections (1320, 1330, and 1340) of the wearable multi-layered protection device 1300. This is shown in greater detail in FIGS. 15A-15D.

FIGS. 15A-15D show the full-arm wearable multilayered protection device of FIGS. 13A-13E in use with the removable skin simulating outer layer partially covering (FIGS. 15A, 15C, and 15D) and fully covering (FIG. 15B) the full-arm wearable multilayered protection device 1300. One or more sections of the removable skin simulating outer layer 1410 can be used. Each section of the removable skin simulating outer layer 1410 can cover all or only part of the device 1300.

Figure 16:
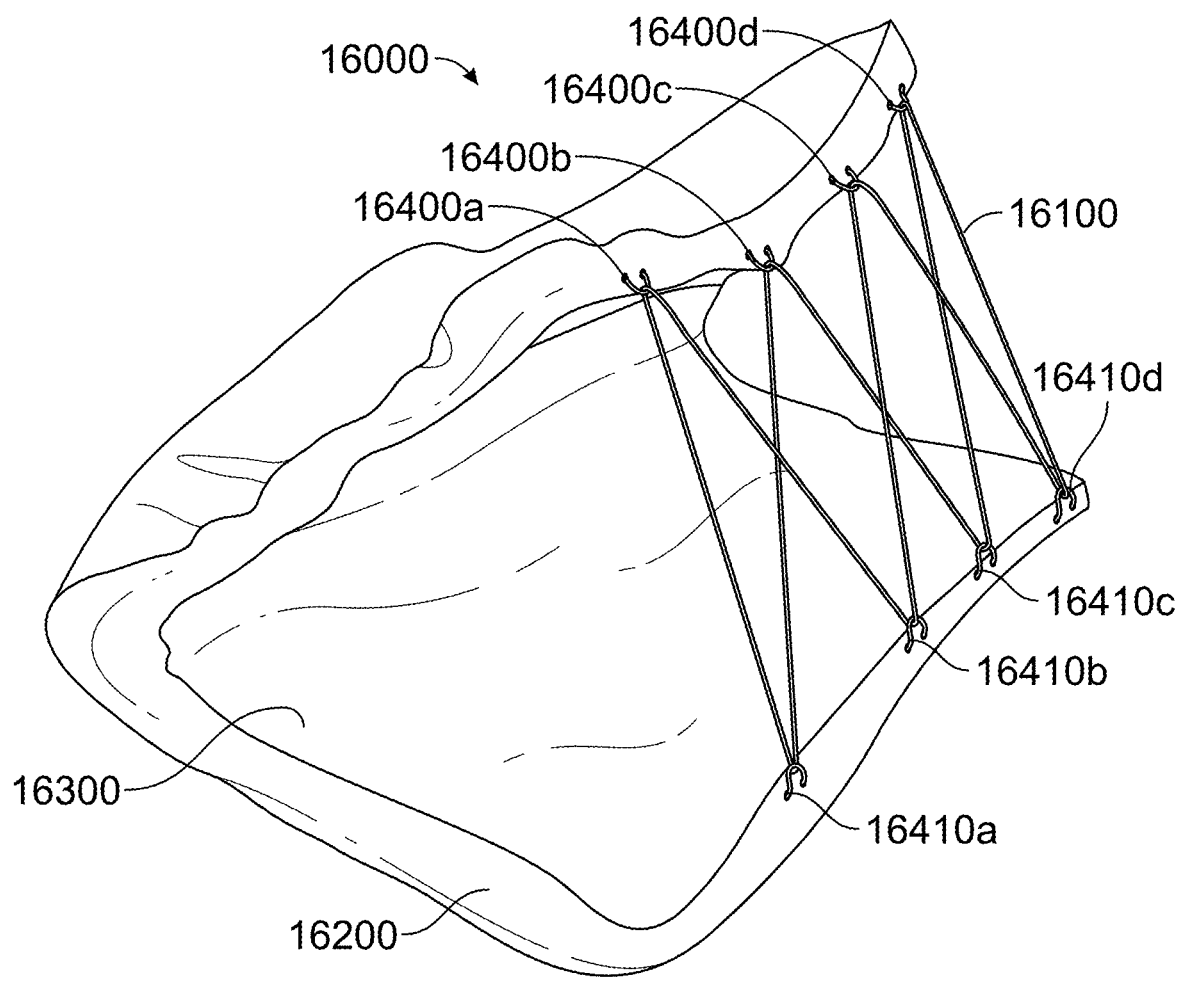
FIG. 16 shows an additional embodiment of a wearable multilayered protection device containing a multi-layered protective covering.

FIG. 16 shows an additional embodiment of a wearable multilayered protection device 16000 containing a multi-layered protective covering 200. The wearable multilayered protection device 16000 of FIG. 16 can contain include loop holes 16400a,b,c,d, . . . n (collectively 16400) on a first edge of a body portion 16300 of the device 16000. The wearable multilayered protection device 16000 of FIG. 16 can contain include loop holes 16410a,b,c,d, . . . n (collectively 16410) on a second edge of a body portion 16300 of the device 16000. The loop holes (16400, 16410) can be configured to receive a suitable tying device 16100. In operation the tying device 16100 can be passed through at least one loop on the first edge 16400 of the body portion 16300 and at least one loop on the second edge 16410 of the body portion 16300. After passing the tying device 16100 through the loops (16400, 16410) the tying device can be tensioned thus moving the device 16000 into a closed position, such as when in use. Suitable tying devices include, but are not limited to, cords, laces, and straps. Other suitable tying devices will instantly be appreciated by those of skill in the art. In some embodiments, the body portion 16300 can include edging material 16200 that can be attached to at least a portion of at least one edge of the body portion 16300. The body portion 16300 can be any desirable shape. It will be appreciated that the shape and dimension of the body portion 16300 can be determined by one of ordinary skill in the art so as to fit a body portion (e.g. arm or leg) of a user. In some embodiments, the body portion 16300 can be made entirely of a multi-layered protective covering 200 described herein.

In other embodiments, at least a part of the body portion 16300 can be made of a multi-layered protective covering 200 described herein.

Figure 17:
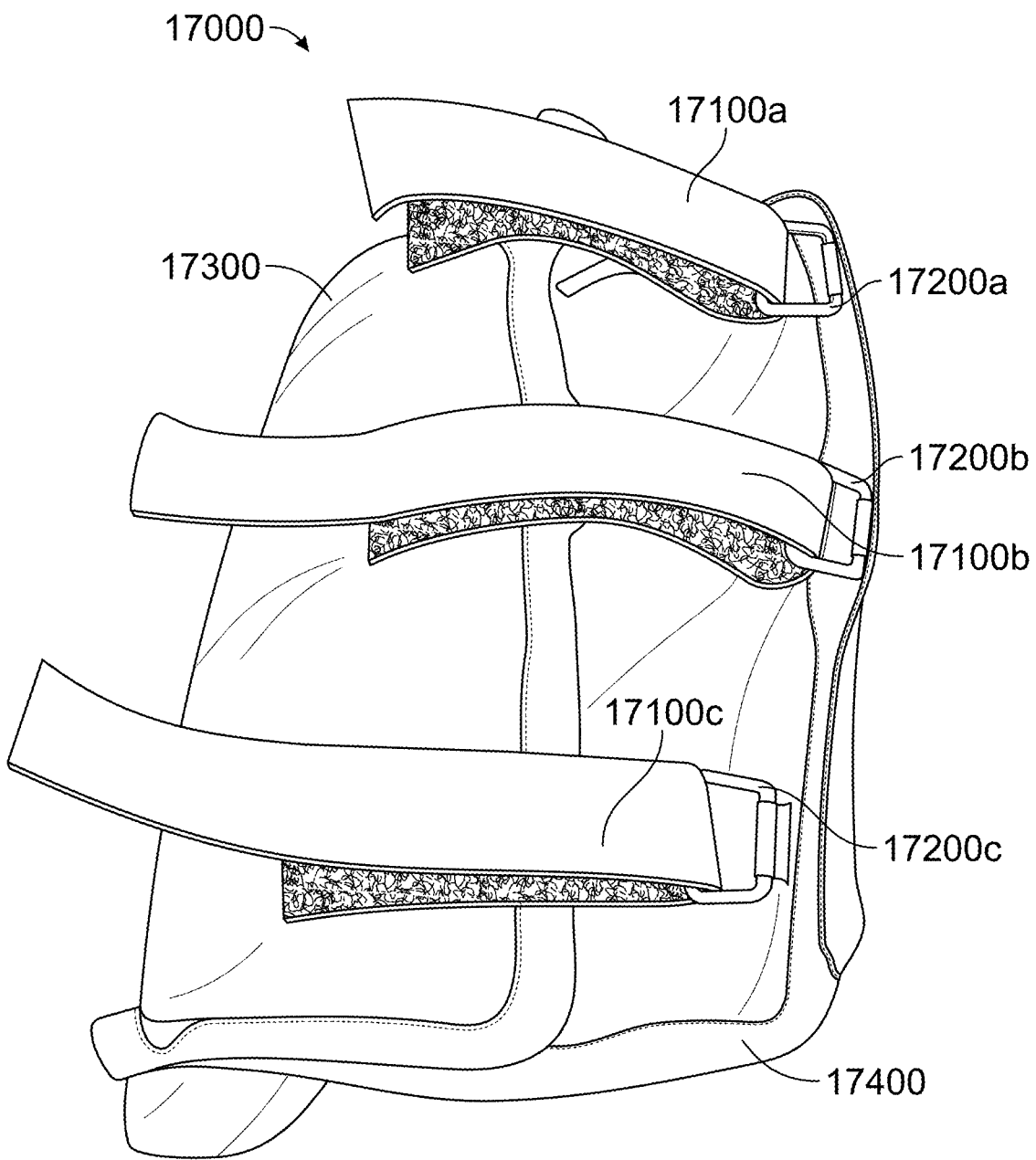
FIG. 17 shows additional embodiment of a wearable multilayered protection device containing a multi-layered protective covering in a closed position.

FIG. 17 shows additional embodiment of a wearable multi-layered protection device 17000 containing a multi-layered protective covering 200 in a closed position. The wearable multi-layered protection device 17000 can have a body portion 17300. The body portion 17300 can include edging material 17400 that can be attached to at least a portion of at least one edge of the body portion 17300. The body portion 17300 can be any desirable shape. It will be appreciated that the shape and dimension of the body portion 17300 can be determined by one of ordinary skill in the art so as to fit a body portion (e.g. arm or leg) of a user. The wearable multi-layered protective device 17000 can include one or more straps 17100a,b,c . . . n (collectively 17100). The straps can have a first end and a second end. The first end(s) of the straps(s) can be attached to the body portion 173000. The wearable multi-layered protective device 17000 can include one or more loop members 17200a, b, c . . . n (collectively 17200). In some embodiments, the body portion 17300 can be made entirely of a multi-layered protective covering 200 described herein. In other embodiments, at least a part of the body portion 17300 can be made of a multi-layered protective covering 200 described herein.

The loop member(s) 17200 can be configured to receive the second end(s) of the strap(s) 17100. In some embodiments the straps can couple to the loop member(s) to secure the device position and/or tension the device 17000 closed. In other embodiments the first and second ends of the strap(s) 17100 can be configured to couple to each other. For example, the first end can have the looped material of a hook and loop closure and the second end of the strap can have the hooked material of a hook and loop closure. In operation, the first end of the strap 17200 can be passed through the loop member and folded over on itself and be coupled to the second end of the strap 17200 that is attached to the body portion 17300.

Figure 18A:
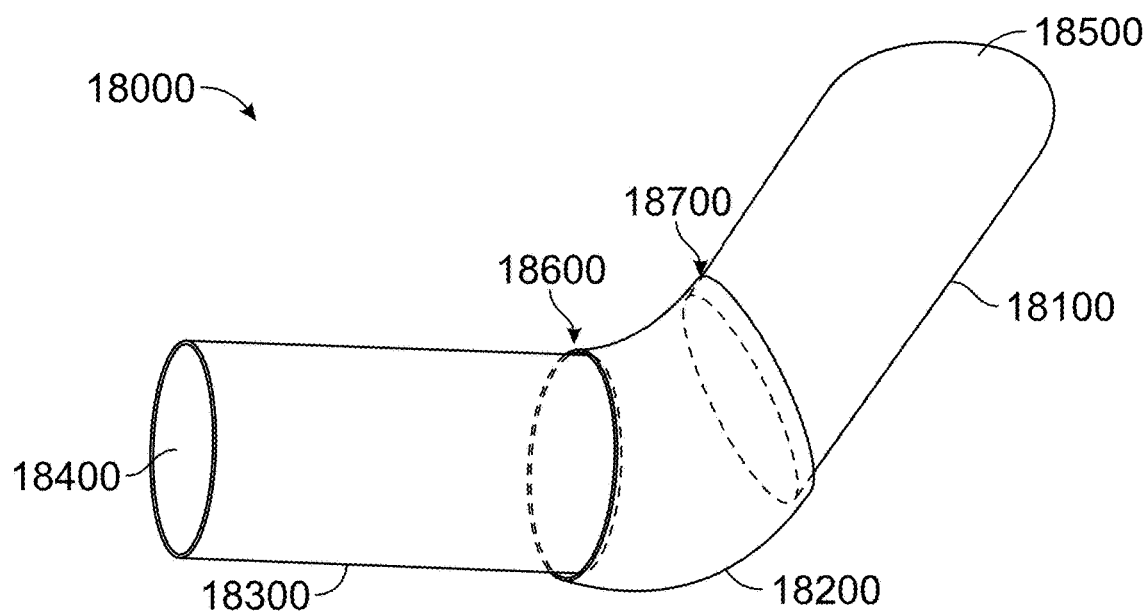
FIGS. 18A-18B show views of an additional embodiment of a wearable multi-layered protection device that can have one or more sections that can be made of or include the multi-layered protective covering described herein in a bent (FIG. 18A) and straightened (FIG. 18B) position.
Figure 18B:
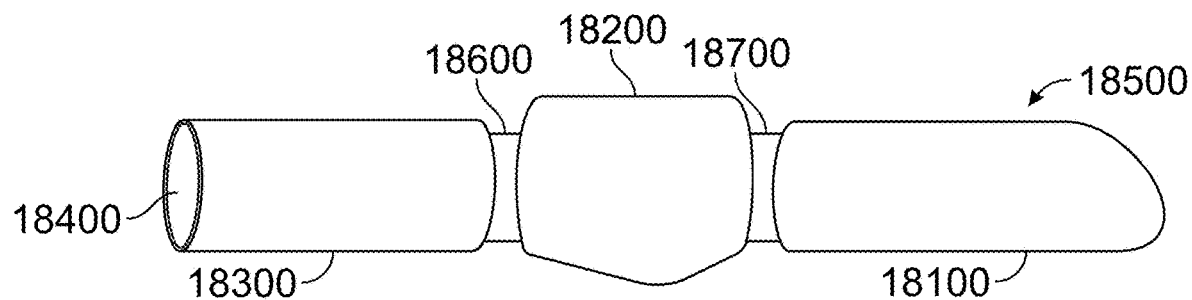

FIGS. 18A-18B show views of an additional embodiment of a wearable multi-layered protection device 18000 that can have one or more sections (e.g. 18100, 18200, and 18300) that can be made of or include the multi-layered protective covering described herein in a bent (FIG. 18A) and straightened (FIG. 18B) position. The sections can include a forearm section 18300, an elbow section 18200, and an upper arm section 18100. The forearm section 18300 can be configured to cover the forearm, the elbow section 18200 can be configured to cover the elbow, and the upper arm section 18100 can be configured to cover the upper arm and optionally the shoulder. In embodiments, the proximal end 18500 of the upper arm section 18100 can be configured to cover the shoulder area.

The sections can be joined by flexible portions 18600, 18700 of material that can telescope in under the sections (18300, 18200, 18100) of the multi-layered protective device 18000 when the arm is bent (FIG. 18A). As shown in FIG. 18B, a first flexible portion 18600 can be attached to the forearm section 18300 and to the elbow section 18200 and a second flexible portion 18700 can be attached to the elbow section 18200 and the upper arm section 18100. In some embodiments, the forearm section 18300, elbow section 18200, upper arm section 18100, and/or flexible portions 18600, 18700 can be made entirely of a multi-layered protective covering 200 described herein. In other embodiments, at least a part of the forearm section 18300, elbow section 18200, and/or upper arm section 18100, and/or flexible portions 18600, 18700 can be made of a multi-layered protective covering 200 described herein.

Figure 19A:
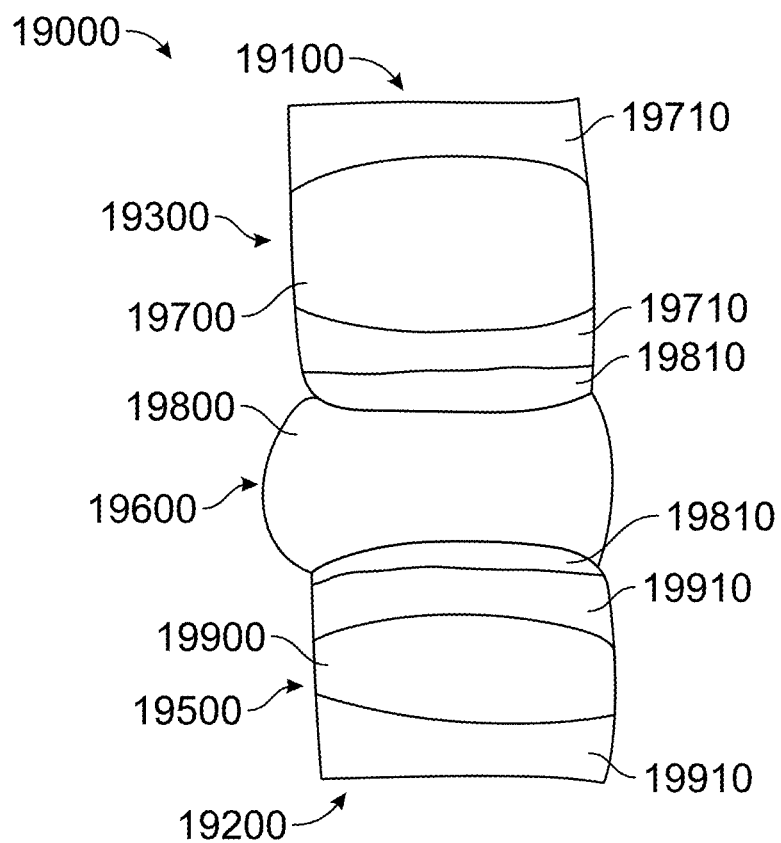
FIGS. 19A and 19B show views of an additional embodiment of a wearable multilayered protection device having a multi-layered protective covering described herein.
Figure 19B:
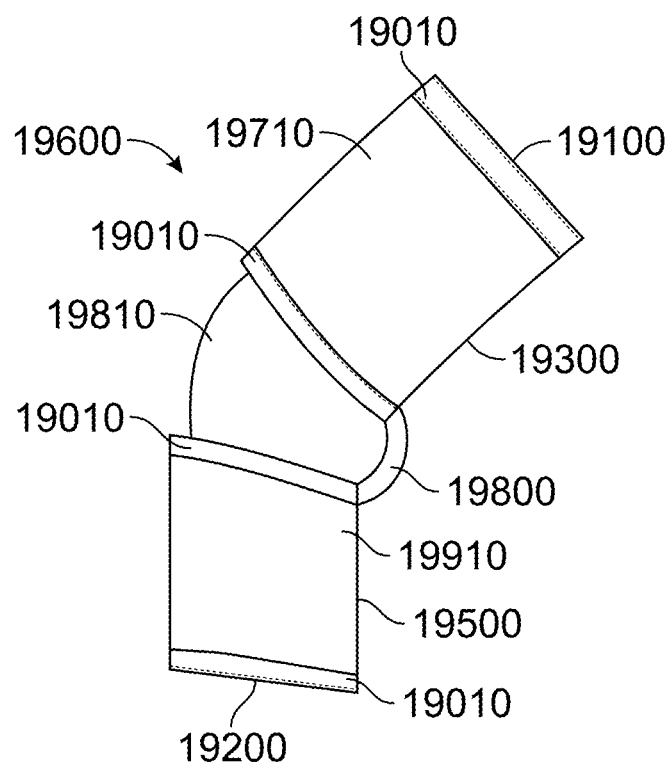

FIGS. 19A and 19B show views of an additional embodiment of a wearable multilayered protection device 19000 having a multi-layered protective covering 200 described herein. FIG. 19A shows a top view of the device 19000. FIG. 19B shows a lateral view of the device 19000 in a bent position. The device 19000 can have three sections: a forearm section 19500 that can be configured to cover the forearm of a user; an elbow section 19600 that can be configured to cover an elbow of a user; and an upper arm section 19300 that can be configured to cover the upper arm of a user. The upper arm section 19300 can have an opening at the proximal end 19100. The forearm section 19500 can have an opening at the distal end 19200 for the hand of a user to pass through. The forearm section 19500, the elbow section 19600, and/or the upper arm section can be made essentially of the multi-layered protective covering 200 described herein. In some embodiments, at least part of the forearm section 19500, the elbow section 19600, and/or the upper arm section can be made of the multi-layered protective covering 200 described herein.

As shown in FIG. 19A, the inside arm side (ventral) of the forearm, elbow, and upper arm sections 19500, 19600, 19300 of the device 19000 can have elastic portions (upper arm section elastic portion 19700; elbow section elastic portion 19800; forearm section elastic portion 19900). The elastic portions can be made out of a material that has at least some elasticity and/or includes an elastic material. The elastic material can provide flexibility to the device and thus minimally restrict the range of motion of the arm. Suitable elastic materials will be appreciated by those of skill in the art.

The side (lateral) and back (dorsal) arm portions of the forearm, elbow, and upper arm sections 19500, 19600, 19300 of the device 19000 can be made essentially of the multi-layered protective covering 200. Further the ventral side of the forearm, elbow, and upper arm sections 19500, 19600, 19300 of the device 19000 can each have portions 19910, 19810, 19710, respectively, that can be made out of the multi-layered protective covering and can be an extension of the side and back arm portions of the forearm, elbow, and upper arm sections 19500, 19600, 19300 of the device 19000. The device can further include edging material 19010 that can be attached to an edge of the forearm, elbow, and/or upper arm section(s) 19500, 19600, 19300 of the device 19000.

Figure 20:
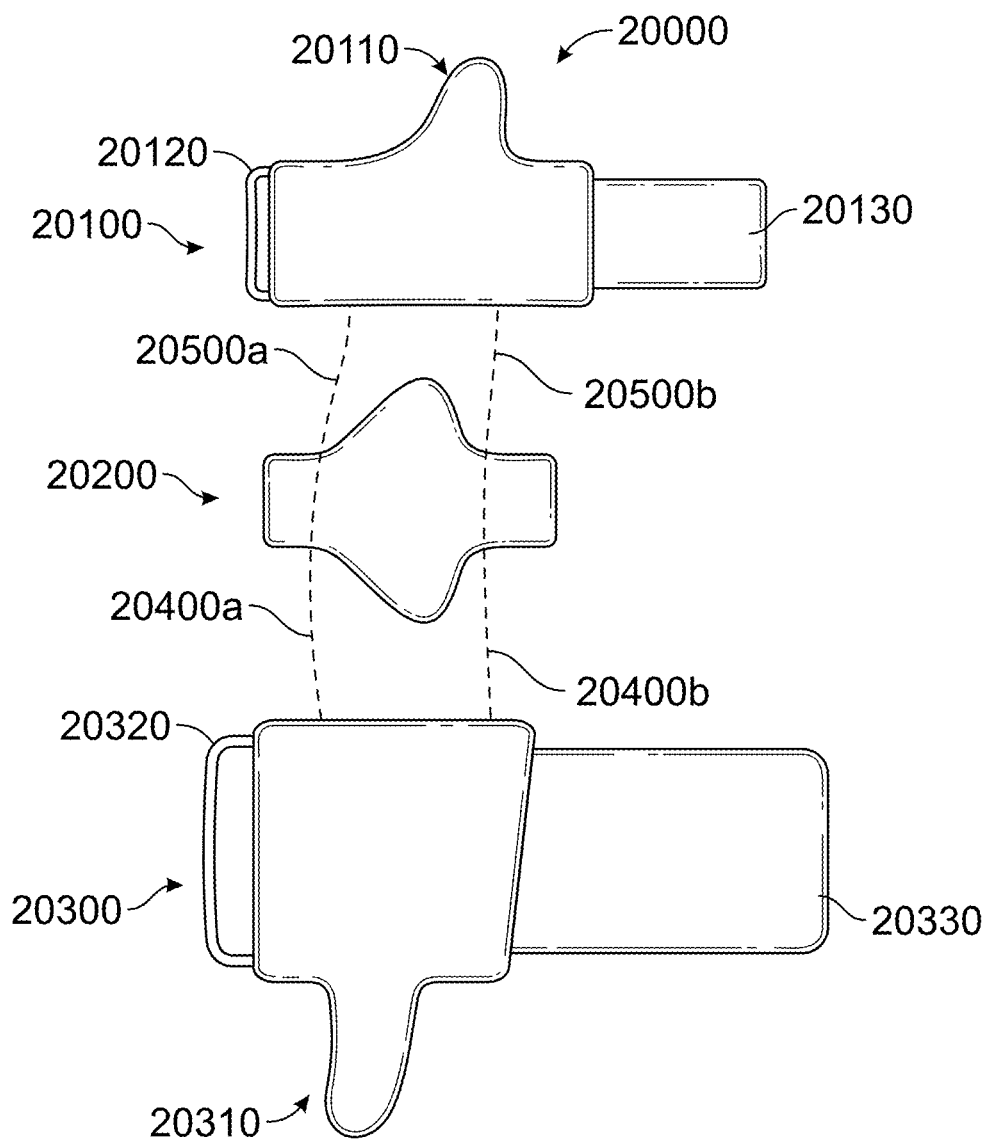
FIG. 20 shows an additional embodiment of a wearable multilayered protection device having a multi-layered protective covering described herein.

FIG. 20 shows an additional embodiment of a wearable multilayered protection device 20000 having a multi-layered protective covering 200 described herein. The device can have three sections: a forearm/hand/wrist section 20300, elbow section 20200, and upper arm/shoulder section 20100. The forearm/hand/wrist section 20300, elbow section 20200, and upper arm/shoulder section 20100 can be made essentially of the multi-layered protective covering 200 described herein. In some embodiments, at least part of forearm/hand/wrist section 20300, elbow section 20200, and upper arm/shoulder section 20100 can be made of the multi-layered protective covering 200 described herein.

The forearm/hand/wrist section 20300 can be so dimensioned and shaped to cover at least part of and/or encompass the forearm as well as the hand/fist and/or wrist of the user. In some embodiments the distal end of the forearm/hand/wrist section 20300 includes an elongated portion 200310 that can cover the hand/fist and/or wrist of the user. The forearm/hand/wrist section 20100 can include one or more straps and/or integrated tabs 20330 that can be configured wrap around at least part of forearm/hand/wrist section 20300. In some embodiments, the forearm/hand/wrist section 20330 can also include one or more loop members and/or strap holders e.g. 20320 configured to receive and/or couple to a strap and/or tab 20330. The strap(s) or tab can fasten to the forearm/hand/wrist section 20300, the strap, and/or loop member 20320 by any suitable fastener or fastening mechanism. Suitable fastener or fastening mechanisms include, but are not limited to hook and loop closures (e.g. Velcro® fasteners), snaps, buckles, or clips. Other suitable fastener or fastening mechanism will be appreciated by those in the art.

The elbow section 20200 can be so dimensioned and shaped (see e.g. FIG. 20) so as to provide protection to the elbow and proximate area throughout the whole range of motion of the arm. The elbow section 20200 can include one or more straps and/or integrated tabs that can be configured wrap around at least part of elbow section 20200. In some embodiments, the elbow section 20200 can also include one or more loop members and/or strap holders configured to receive and/or couple to a strap and/or tab. The strap(s) or tab can fasten to the elbow section 20200, the strap, and/or loop member by any suitable fastener or fastening mechanism. Suitable fastener or fastening mechanisms include, but are not limited to hook and loop closures (e.g. Velcro® fasteners), snaps, buckles, or clips. Other suitable fastener or fastening mechanism will be appreciated by those in the art.

The upper arm section 20100 can be so dimensioned and shaped to cover at least part of and/or encompass the upper arm as well as the shoulder of the user. In some embodiments the proximal end of the upper arm section 20100 includes an elongated portion 200110 that can cover the shoulder of the user. The upper arm section 20100 can include one or more straps and/or integrated tabs 20130 that can be configured wrap around at least part of upper arm section 20100. In some embodiments, the forearm/hand/wrist section 20130 can also include one or more loop members and/or strap holders e.g. 20120 configured to receive and/or couple to a strap and/or tab 20130. The strap(s) or tab can fasten to the upper arm section 20100 the strap, and/or loop member 20120 by any suitable fastener or fastening mechanism. Suitable fastener or fastening mechanisms include, but are not limited to hook and loop closures (e.g. Velcro® fasteners), snaps, buckles, or clips. Other suitable fastener or fastening mechanism will be appreciated by those in the art.

The forearm/hand/wrist section 20300, elbow section 20200, and upper arm/shoulder section 20100 can be coupled together using suitable fastener or tying devices (20500a,b and 2400a,b) as shown in FIG. 20. Suitable fastener or fastening mechanisms include, but are not limited to hook and loop closures (e.g. Velcro® fasteners), snaps, buckles, or clips. The fasteners can also be elastic straps or bands as shown in FIG. 20. Other suitable fasteners and tying devices will be appreciated by those of skill in the art.

Figure 21B:
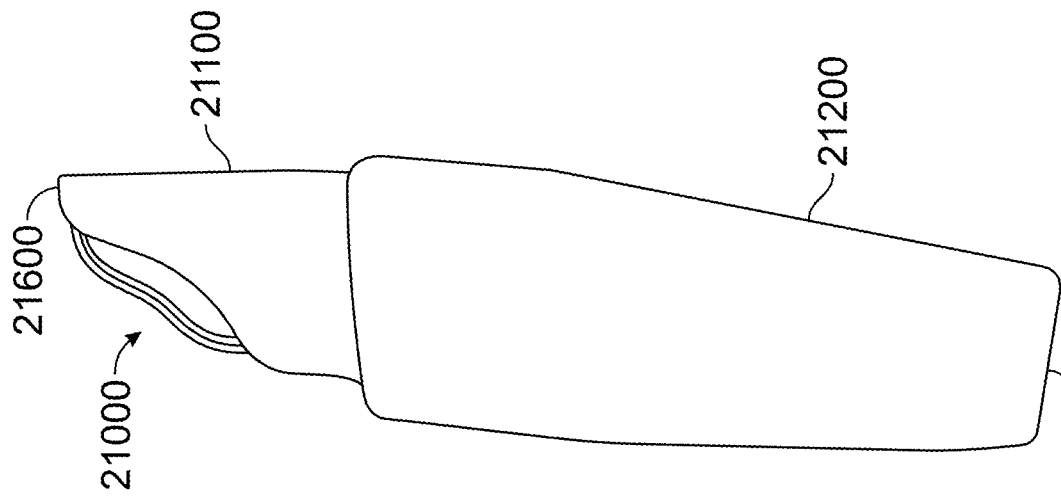
FIGS. 21A and 21B show views of an additional embodiment of a wearable multilayered protection device having a multi-layered protective covering described herein in the open position (FIG. 21A) and the closed position (FIG. 21B).
Figure 21A:
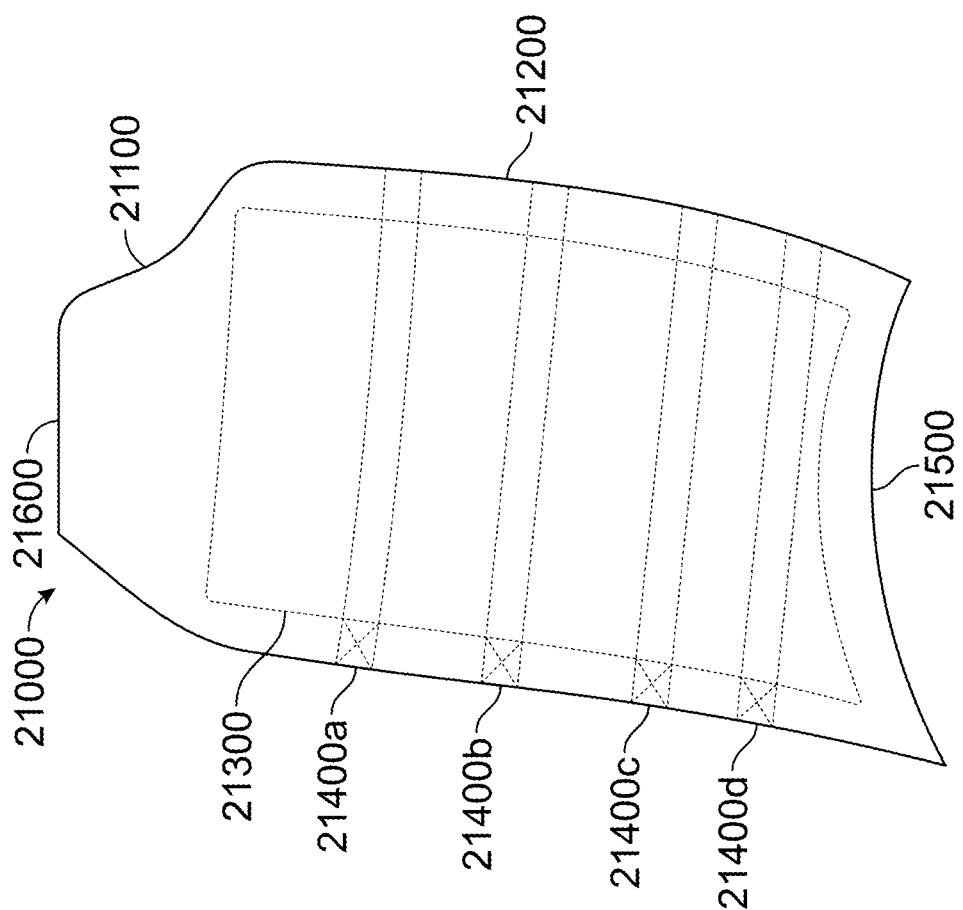

FIGS. 21A and 21B show views of an additional embodiment of a wearable multilayered protection device having a multi-layered protective covering described herein in the open position (FIG. 21A) and the closed position (FIG. 21B). The device 21000 can have a body portion that can be so shaped as to have to integrated but distinct sections: a distal body portion 21200 and a proximal body portion 21110. The body portion is configured such that when in the closed position the proximal body portion 21110 can provide protection to the outer upper arm and shoulder area while not having material under the upper arm so as to restrict movement of the arm. The device 21000 can have a distal edge 21500 that can form a distal opening when in the closed position. The device 21000 can have a proximal edge 21600 that can form a proximal opening. The device 21000 can further include one or more securing members 21400a, b, c, d, . . . n (collectively 21400) that can be configured to hold the device in the closed position when engaged and in use. The securing members 21400 can be any suitable strap, tab, or other fastening mechanism or device. The distal body portion 21200 and/or the proximal body portion 21110 can be made essentially of the multi-layered protective covering 200 described herein. In some embodiments, at least part of the distal body portion 21200 and/or the proximal body portion 21110 can be made of the multi-layered protective covering 200 described herein.

Figure 22A:
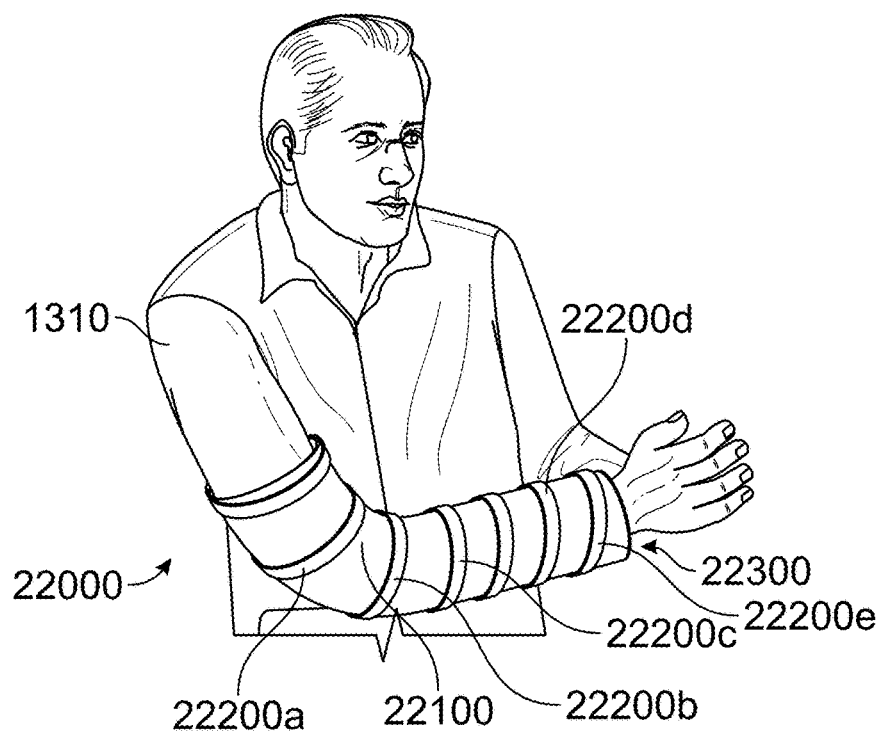
FIGS. 22A-22C show views of an additional embodiment of a wearable multilayered protection device having a multi-layered protective covering described herein in use (FIG. 22A) and components thereof (FIGS. 22B-22C).
Figure 22B:
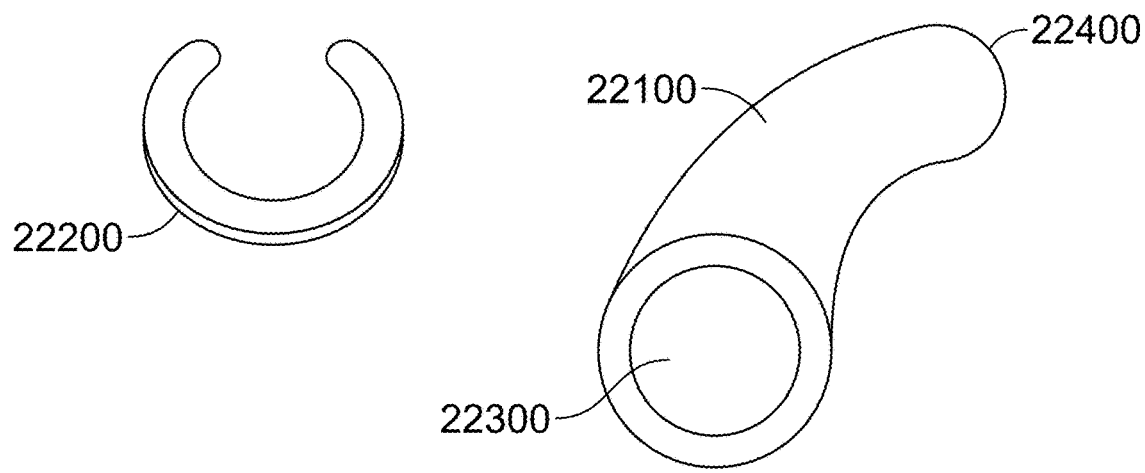
Figure 22C:
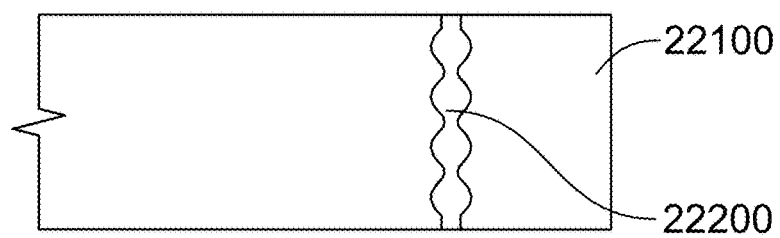

FIGS. 22A-22C show views of an additional embodiment of a wearable multilayered protection device having a multi-layered protective covering described herein in use (FIG. 22A) and components thereof (FIGS. 22B-22C). The device 2200 can include a sleeve member 22100. The sleeve member 22100 can be made essentially of the multi-layered protective covering 200 described herein. In some embodiments, at least part of the sleeve member 22100 can be made of the multi-layered protective covering 200 described herein. The sleeve member can have a proximal opening 22400 and a distal opening 22300. The user can wear the device 22100 by inserting the user's arm into the proximal opening 22400 of the sleeve member 22100 and out through the distal opening 22300 of the sleeve member 22100. The device 221100 can also include clamps 22200a, b, c, d, e . . . n (collectively 22200). The clamps can be configured such that when in use they apply a force to the user's arm such that the sleeve member 22100 is secured in place. In some embodiments, the clamps 222000 can be coupled to the outside of the sleeve member 22100 after the sleeve member has been put on the arm of the user 1310. In other embodiments, the clamps 22200 can be coupled to the inside of the sleeve member. The clamps can be made out of any suitable material. Suitable materials will be appreciated by those of skill in the art.

We claim:

1. A wearable multi-layer protective covering comprising:
   a first flexible layer, wherein the first flexible layer comprises a body-interface material;
   a second flexible layer, wherein the second flexible layer comprises a force-dissipating material and wherein the second flexible layer is attached to one side of the first flexible layer, wherein the force dissipating material has a Young's modulus ranging from about 2 PSI to about 200 PSI;
   a third flexible layer, wherein the third flexible layer comprises a soft-tissue simulating material and wherein the third flexible layer is attached to the other side of the second flexible layer such that the second flexible layer is sandwiched between the first flexible layer and the third flexible layer; and
   a fourth flexible layer, wherein the fourth flexible layer comprises a puncture-resistant material and wherein the puncture-resistant material is attached to the other side of the third flexible layer such that the third flexible layer is sandwiched between the second flexible layer and the fourth flexible layer.

2. The wearable multi-layer protective covering of claim 1, further comprising
   a fifth flexible layer, wherein the fifth flexible layer comprises a skin simulating material and wherein the fifth flexible layer is removably in contact with one side of the fourth flexible layer such that the fourth flexible layer is sandwiched between the third flexible layer and the fifth flexible layer.

3. The wearable multi-layer protective covering of claim 1, further comprising
   a fifth flexible layer, wherein the fifth flexible layer comprises a tractable surface material and wherein the fifth flexible layer is attached with one side of the fourth flexible layer such that the fourth flexible layer is sandwiched between the third flexible layer and the fifth flexible layer.

4. The wearable multi-layer protective covering of claim 1, wherein the wearable multi-layer protective covering is configured as a sleeve adapted for covering at least a part of at least a forearm of a human.

5. The wearable multilayer protective covering of claim 4, wherein the sleeve is adapted for covering at least a part of at least a forearm, an elbow, and an upper arm of a human.

6. The wearable multilayer protective covering of claim 5, wherein the sleeve further comprises:
   a first section adapted for covering at least a part of a forearm;
   a second section adapted for covering at least a part of an elbow; and
   a third section adapted for covering at least a part of an upper arm,
   wherein the first section is flexibly attached to the second section and wherein the second section is flexibly attached to the third section such that the second section is sandwiched between the first section and the third section.

7. The wearable multilayer protective covering of claim 1, wherein the wearable multi-layer protective covering is configured as a vest adapted for covering at least a torso of a human or animal.

8. The wearable multilayer protective covering of claim 1, wherein the wearable multi-layer protective covering is configured as a sleeve adapted for covering at least a part of a leg of a human or animal.

9. The wearable multilayer protective covering of claim 1, wherein the wearable multi-layer protective covering is configured as a suit adapted for covering at least a part of a torso and a limb of a human or animal.

10. The wearable multilayer protective covering of claim 1, wherein the body-interface material is selected from the group consisting of: nylon, spandex material, elastic polyurethane, neoprene, jersey knit, polyester polypropylene, flannel, neoprene foam, cotton knit and combinations or composites thereof.

11. The wearable multilayer protective covering of claim 1, wherein the force-dissipating material is selected from the group consisting of: high-density polyurethane foam, low-density polyurethane foam, high-density polyethylene foam, low-density polyethylene foam, latex foam, viscoelastic foam, gel visco foam, neoprene foam, cellular urethane foam, metal foam, ballistic gel, natural or synthetic rubber and combinations thereof.

12. The wearable multilayer protective covering of claim 1, wherein the soft-tissue simulating material is selected from the group consisting of: ballistic gel, high-density polyurethane foam, low-density polyurethane foam, high-density polyethylene foam, low-density polyethylene foam, latex foam, viscoelastic foam, gel visco foam, neoprene foam, cellular urethane foam, metal foam, natural rubber, synthetic rubber, and combinations thereof.

13. The wearable multilayer protective covering of claim 1, wherein the puncture-resistant material is selected from the group consisting of: Kevlar® fabric, carbon fiber, synthetic spider silk protein, guard plate containing fabric, woven aramid yarn fabric, woven aramid and polyester fabric, liquid-crystal polymer fabric, ultra-high molecular weight polyethylene, and combinations thereof.

14. The wearable multilayer protective covering of claim 1, wherein the skin simulating material is selected from the group consisting of: silicone, leather, fresh pigskin, neoprene, polycarbonate, and combinations thereof.

15. The wearable multilayer protective covering of claim 1, wherein the second flexible layer and the third flexible layer combined to form a single layer, wherein the force-dissipating material and the soft-tissue simulating are the same material.

16. The wearable multilayer protective covering of claim 3, wherein the tractable surface material is selected from the group consisting of: cotton/polyester blended fabric, nylon, ballistic nylon, and combinations thereof.

17. The wearable multilayer protective covering of any one of claim 1, wherein the thickness of the wearable multilayer protective covering ranges from about 0.5 cm to about 2.0 cm.

18. A method of training a dog, comprising:
encouraging a dog to bite a wearable multilayer protective covering, wherein the multi-layer protective covering comprises:
   a first flexible layer, wherein the first flexible layer comprises a body-interface material;
   a second flexible layer, wherein the second flexible layer comprises a force-dissipating material and wherein the second flexible layer is attached to one side of the first flexible layer, wherein the force dissipating material has a Young's modulus ranging from about 2 PSI to about 200 PSI;
   a third flexible layer, wherein the third flexible layer comprises a soft-tissue simulating material and wherein the third flexible layer is attached to the other side of the second flexible layer such that the second flexible layer is sandwiched between the first flexible layer and the third flexible layer; and
   a fourth flexible layer, wherein the fourth flexible layer comprises a puncture-resistant material and wherein the puncture-resistant material is attached to the other side of the third flexible layer such that the third flexible layer is sandwiched between the second flexible layer and the fourth flexible layer.

* * * * *